United States Patent [19]
Krupke et al.

[11] Patent Number: 5,348,437
[45] Date of Patent: Sep. 20, 1994

[54] VEHICLE RESTRAINING APPARATUS

[75] Inventors: Leroy G. Krupke, Carrollton; James L. Grisham, Denison; David S. Boucher, Rowlett, all of Tex.

[73] Assignee: Overhead Door Corporation, Dallas, Tex.

[21] Appl. No.: 217,010

[22] Filed: Mar. 23, 1994

Related U.S. Application Data

[63] Continuation of Ser. No. 63,144, May 17, 1993, abandoned.

[51] Int. Cl.$^5$ ............................................. B65G 67/02
[52] U.S. Cl. ...................................... 414/401; 414/584
[58] Field of Search ................. 414/396, 401, 584; 14/71.1, 71.3, 71.7

[56] References Cited

U.S. PATENT DOCUMENTS

| | | | |
|---|---|---|---|
| Re. 32,968 | 6/1989 | Hahn | 414/401 |
| Re. 33,154 | 1/1990 | Hahn et al. | 414/401 |
| Re. 33,242 | 6/1990 | Hipp et al. | 414/401 |
| 2,649,217 | 8/1953 | Mertes | 414/401 X |
| 2,693,284 | 11/1954 | Gerhardt | 414/584 |
| 4,127,856 | 11/1978 | Bickel | 14/71.1 X |
| 4,146,888 | 3/1979 | Grunewald et al. | 414/401 X |
| 4,148,498 | 4/1979 | Taylor, Jr. | 280/482 |
| 4,191,503 | 3/1980 | Neff et al. | 414/401 |
| 4,208,161 | 6/1980 | Hipp et al. | 414/401 |
| 4,264,259 | 4/1981 | Hipp | 414/401 |
| 4,267,748 | 5/1981 | Grunewald et al. | 74/529 |
| 4,282,621 | 8/1981 | Anthony et al. | 14/71.1 |
| 4,364,137 | 12/1982 | Hahn | 14/71.3 |
| 4,373,847 | 2/1983 | Hipp et al. | 414/401 |
| 4,379,354 | 4/1983 | Hahn et al. | 14/71.3 |
| 4,400,127 | 8/1983 | Metz | 414/401 |
| 4,443,150 | 4/1984 | Hahn et al. | 414/401 |
| 4,472,099 | 9/1984 | Hahn et al. | 414/401 |
| 4,488,325 | 12/1984 | Bennett et al. | 14/71.3 |
| 4,531,470 | 7/1985 | Paul | 114/230 |
| 4,553,895 | 11/1985 | Ellis | 414/401 |
| 4,555,211 | 11/1985 | Metz | 414/401 |
| 4,560,315 | 12/1985 | Hahn | 414/401 |
| 4,589,813 | 5/1986 | Hagen et al. | 414/401 |
| 4,605,353 | 8/1986 | Hahn et al. | 414/401 |
| 4,630,989 | 12/1986 | Davey | 414/401 |
| 4,634,334 | 1/1987 | Hahn et al. | 414/401 |
| 4,648,781 | 3/1987 | Sikora | 414/401 |
| 4,664,582 | 5/1987 | Edmeads | 414/401 |

(List continued on next page.)

*Primary Examiner*—David A. Bucci
*Attorney, Agent, or Firm*—Kenneth R. Glaser

[57] ABSTRACT

A vehicle restraining apparatus is disclosed which is adapted to be disposed adjacent a fixed structure, such as a loading dock, for securing a vehicle adjacent the fixed structure. In a typical application, the apparatus is disposed adjacent a loading dock for restraining trucks which are backed into a position adjacent the dock during loading and unloading operations. The apparatus includes an articulated structure adapted to be deployed in a vehicle-engaging position adjacent an upright surface of the dock for engaging an adjacent vehicle. The articulated structure includes upper and lower vertically aligned pivot arms, and an actuator is provided for pivoting the upper arm upwardly in a first pivotal direction about a pivot axis substantially perpendicular to the upright surface, and pivoting the lower arm, about a second pivot axis spaced from the first axis, in a second, opposite pivotal direction, the distal end portion of the upper arm being thereby brought into engagement with a structural portion of the vehicle. In a preferred embodiment, a keeper member is mounted on the distal end portion of the upper pivot arm, the keeper member being positioned to seat in front of a horizontally-extending structural member of a vehicle, for securing the vehicle. In a preferred embodiment, the pivot arms of the articulated structure are pivotable about respectively different pivot axes extending substantially horizontally, for maintaining the keeper member in a vertical orientation. In one embodiment, a fluid operated system is provided for retracting the articulated structure.

18 Claims, 9 Drawing Sheets

U.S. PATENT DOCUMENTS

| | | | |
|---|---|---|---|
| 4,674,941 | 6/1987 | Hageman | 414/401 |
| 4,695,216 | 9/1987 | Erlandsson | 414/401 |
| 4,735,542 | 3/1988 | Fisher et al. | 414/401 |
| 4,759,678 | 7/1988 | Hageman | 414/401 |
| 4,767,254 | 8/1988 | Kovach et al. | 414/401 |
| 4,784,567 | 11/1988 | Hageman et al. | 414/401 |
| 4,815,918 | 3/1989 | Bennett et al. | 414/401 |
| 4,818,170 | 4/1989 | Fisher et al. | 414/401 |
| 4,830,563 | 5/1989 | Yeakle | 414/401 |
| 4,861,217 | 8/1989 | Erlandsson | 414/401 |
| 4,865,508 | 9/1989 | Carlson | 414/401 |
| 4,887,954 | 12/1989 | Gregerson et al. | 414/401 |
| 4,915,568 | 3/1990 | West | 414/401 |
| 4,938,647 | 7/1990 | Erlandsson | 414/401 |
| 4,938,648 | 7/1990 | Horan et al. | 414/401 |
| 4,946,330 | 8/1990 | Pedersen et al. | 414/401 |
| 4,963,068 | 10/1990 | Gelder | 414/401 |
| 4,964,777 | 10/1990 | Kleynjans et al. | 414/401 |
| 4,969,792 | 11/1990 | Ellis et al. | 414/401 |
| 4,973,213 | 11/1990 | Erlandsson | 414/401 |
| 4,988,254 | 1/1991 | Alexander | 414/401 |
| 5,026,242 | 6/1991 | Alexander | 414/401 |
| 5,096,359 | 3/1992 | Alexander | 414/401 |
| 5,120,181 | 6/1992 | Alexander | 414/401 |
| 5,203,663 | 4/1993 | Ruppe | 414/401 |
| 5,249,905 | 10/1993 | Warner et al. | 414/401 |

VEHICLE RESTRAINING APPARATUS

This is a continuation of prior application Ser. No. 08/063,144 filed May 17, 1993, now abandoned.

FIELD OF THE INVENTION

This invention relates to vehicle restraining apparatus and, more particularly, to a vehicle restraining apparatus having an articulated vehicle-engaging structure.

BACKGROUND OF THE INVENTION

During loading and unloading of trucks, trailers and other vehicles it is important that the vehicles be secured to prevent accidental movement thereof. Such vehicles typically are parked adjacent to a dock or other fixed structure during loading or unloading operations, and should the vehicles roll away from the dock, damage may occur to the vehicles or adjacent vehicles, and injuries may occur to workers nearby. Wheel chocks have been used for preventing such movement, but they do not afford adequate reliability for many applications in that they may slip on wet, iced, or greased surfaces, and they are subject to being misplaced or stolen.

BACKGROUND OF THE PRIOR ART

In the past, various vehicle restraining mechanisms have been devised for securing such vehicles adjacent to a loading dock, but they entail several limitations. In a typical application of such a vehicle restraining mechanism, a truck is backed toward a loading dock and parked with its rear end adjacent the dock for permitting loading or unloading of the vehicle. The vehicle restraining mechanism is generally secured to the loading dock and/or the pavement adjacent the loading dock for releasably engaging a structural member of the truck. Such mechanisms normally engage what is termed an "ICC bar" located on the rear underside of the truck, such ICC bars including a crosspiece which extends horizontally across a central portion of the truck behind the rear wheels. Conventional vehicle restraining mechanisms have typically employed a vehicle-engaging member such as a hook or other type keeper member positioned to engage or be forward of the crosspiece, the keeper member being supported by an adjustable deployment mechanism operable to bring the keeper member into alignment with the ICC bar crosspiece of an adjacent vehicle when the vehicle is parked in the desired position adjacent the loading dock.

Several considerations are entailed in maintaining such keeper members in secure engagement with the ICC bars of various vehicles. For example, the heights and configurations of the ICC bars of various trucks and trailers may vary, and the ICC crosspiece of a respective vehicle may be as low as twelve inches from the pavement, in a heavily loaded vehicle, or as high as thirty inches or more. Thus, the deployment mechanism of such a vehicle restraining apparatus must be capable of deployment from a retracted position, in which the mechanism and keeper member are positioned below the lowermost portion of the ICC bar of any heavily loaded vehicle expected to be engaged thereby, and a projected position in which the keeper member is of sufficient height to engage the highest ICC bar to be anticipated, generally of an unloaded vehicle. Moreover, it is normally desirable that the deployment mechanism and keeper member be capable of float as the vehicle which is engaged by the keeper member is loaded and unloaded. In addition, the vehicle restraint should be of sufficient structural strength to sustain substantial lateral loads or torque which may be imposed thereon should a captured vehicle tend to roll away from a dock.

Prior art vehicle restraining apparatus have employed a variety of mechanisms for performing such functions. One class of such mechanisms, termed herein track-guided mechanisms, are mounted to the face of the dock and employ tracks or guides in which a translatable carriage or the like is adapted to travel, which carriage supports a hook or other extension adapted to engage the vehicle ICC bar. Such track-guided mechanisms are generally of relatively complex construction, employing a number of movable parts. Additionally, because their tracks or guideways are typically are exposed to the elements, dirt and rust may accumulate on the tracks and other moving components, hindering operation of the mechanism. It will be appreciated that the environment in which such vehicle restraining mechanisms are employed is typically unsheltered, and that dirt and grease tends to accumulate on the tracks and other exposed components of the mechanisms. Additionally, because of the complex construction of such track-following apparatus, they have generally been undesirably expensive and, in some embodiments, complex in operation. A further disadvantage of such apparatus is that their tracks or guideways are susceptible to being damaged by impact from trucks and trailers as they are backed toward the dock.

In another class of prior art vehicle restraining apparatus, a trackless pivotable mechanism is employed for pivoting a keeper member along a normally arcuate path into engagement with or forward of the ICC bar of the vehicle to be loaded or unloaded. Such a mechanism typically employs at least one pivot arm structure adapted to pivot about an axis which extends either parallel with or perpendicular to the dock whereby the keeper member may be pivoted along the circumference of the arcuate path toward and into engagement with or forward the crosspiece of the ICC bar.

The prior art systems have not proved entirely satisfactory for all conditions of service. For example, those prior art systems which employ a single axially pivotal arm structure, whether track or trackless, entail inherent disadvantages. First, the length of the pivot arm structure of such a mechanism must be necessarily longer than the height of the highest ICC bar anticipated to be engaged, while at the same time of a length adapted to engage the lowest anticipated ICC bar. An excessively long pivot arm is not only difficult to align with adjacent vehicles, but will be subjected to excessive loads associated with heavily loaded vehicles tending to roll away from the dock, during which substantial forces are imposed on the pivot arm structure and transmitted along the length of the pivot arm structure to the operating mechanism which supports the pivot arm. Accordingly, a substantial mechanical advantage exists between the lever defined by the length of the pivot arm structure from its rotational axle, and forces on this pivot arm will be increased by this mechanical advantage, resulting in substantial and potentially destructive forces being applied to the operating mechanism, thus requiring that such mechanism be adequately supported against such forces by suitable support means. When the support means is part of or the structure affixed to the dock face, its susceptibility to damage, as previously discussed, is present.

Moreover, the distal end portion of such a prior art single pivot arm assembly travels through an arc which has a substantial horizontal as well as vertical component. Thus, the keeper portion on the distal end of the pivot arm is also necessarily laterally displaced a substantial distance during deployment. Substantial lateral movement of the keeper member is undesirable and may result in interference with other portions of the vehicle.

OBJECTS OF THE INVENTION

It is, accordingly, a major object of the present invention to provide a new and improved vehicle restraining apparatus.

Another object is to provide such a vehicle restraining apparatus which is of highly reliable operation and which is adapted for use during extended periods, with little maintenance, in an environment in which it may be exposed to extremes of weather, dirt, and the like.

A further object is to provide such a vehicle restraining apparatus which is of relatively simple, rugged construction, entailing few moveable parts.

A still further object is to provide such a vehicle restraining apparatus which does not require the use of a track or guideway on the face of the dock, and one in which the operating mechanism in a retracted mode has a low profile, extending below the lowermost structural elements of vehicles to be engaged thereby.

Another object is to provide new and improved vehicle restraining apparatus which avoids undesirable lateral movement normally associated with pivotally operated apparatus.

A further object is to provide new and improved vehicle restraining apparatus of the type which rely upon the road surface to provide assistance in sustaining the forces transmitted to the pivot axes by the outward movement of the restrained vehicle.

Other objects and advantages of the invention will become apparent from the specification and accompanying claims and from the accompanying drawings.

SUMMARY OF THE INVENTION

In accordance with the invention, vehicle restraining apparatus comprises a supporting structure adapted and designed to be supported upon the roadway surface or pavement adjacent a loading dock and further comprises an articulated structure for engaging a vehicle parked adjacent the dock. The articulated structure includes upper and lower arms, the lower arm being pivotally movable about a first pivot axis transverse of the loading dock and the upper arm being pivotally movable about a second pivot axis parallel to but laterally spaced from the first axis. An actuating mechanism is connected to the articulated structure for deploying the structure from its stored mode, in which the upper and lower arms are both retracted, to its vehicle-engaging mode, in which the upper arm is in engagement with a structural member of the vehicle. In accordance with unique features of the design, the two arms are in substantial vertical alignment with one another and are symmetrically disposed with respect to the supporting structure.

In one embodiment, retraction of the articulated structure is accomplished manually, for example by means of a push rod or the like. In another embodiment, a remotely controlled hydraulic system is employed for retracting the articulated structure and locking it in its retracted position.

BRIEF DESCRIPTION OF DRAWINGS

For a more complete understanding of the invention, reference should be made to the accompanying drawings, wherein.

DESCRIPTION OF THE PREFERRED EMBODIMENTS

Figure 1:
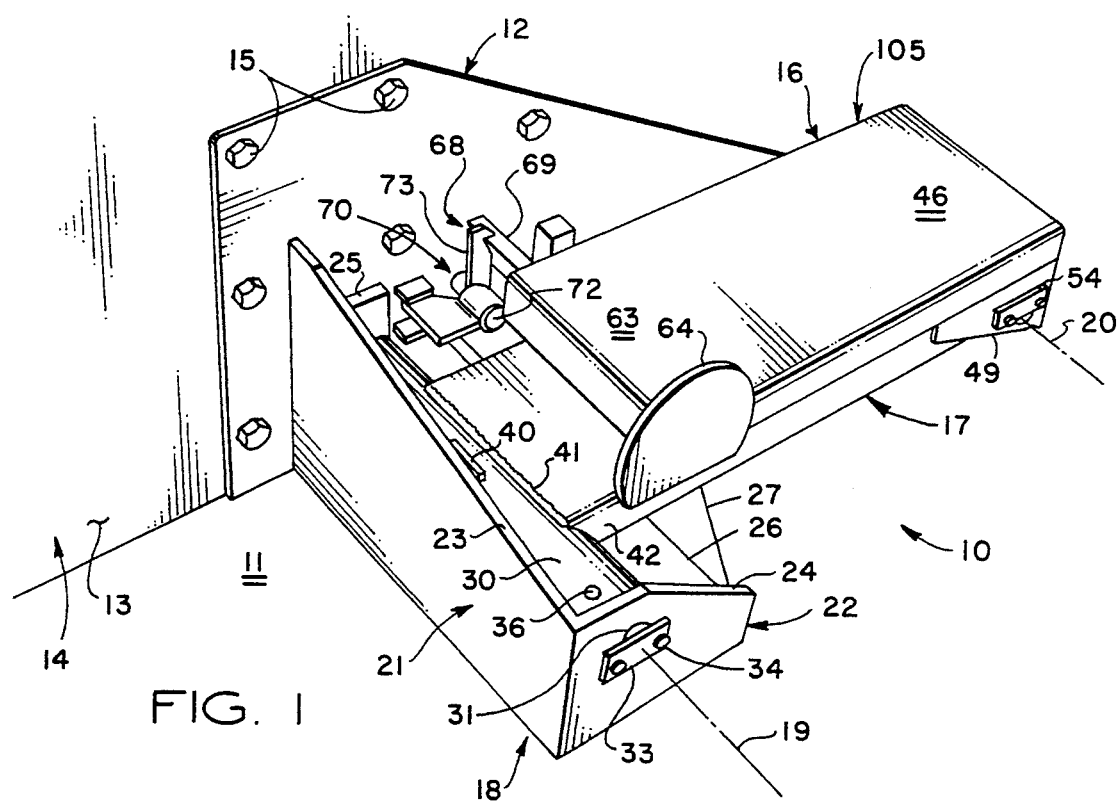
FIG. 1 is a perspective view of the vehicle restraining apparatus, in accordance with one preferred embodiment, in a retracted position and showing portions of a loading dock adjacent the apparatus.

In the description to follow, like parts are designated throughout the specification and drawings with the same reference numerals, respectively. The drawings are not necessarily to scale, and in certain views portions have been exaggerated for purposes of clarity.

With initial reference to FIG. 1, the vehicle restraining apparatus 10 has a supporting structure 18 designed and adapted to be supported on a vehicle surface or roadway 11 adjacent dock 14. In accordance with one embodiment, the apparatus 10 may include a plate 12 adapted to be affixed, for example by bolts 15, to the substantially vertical, outer face 13 of the loading dock. Alternatively, the supporting structure could be affixed solely to the pavement 11 by providing an appropriate assembly, such as bolts through plate 27 for example.

Figure 2:
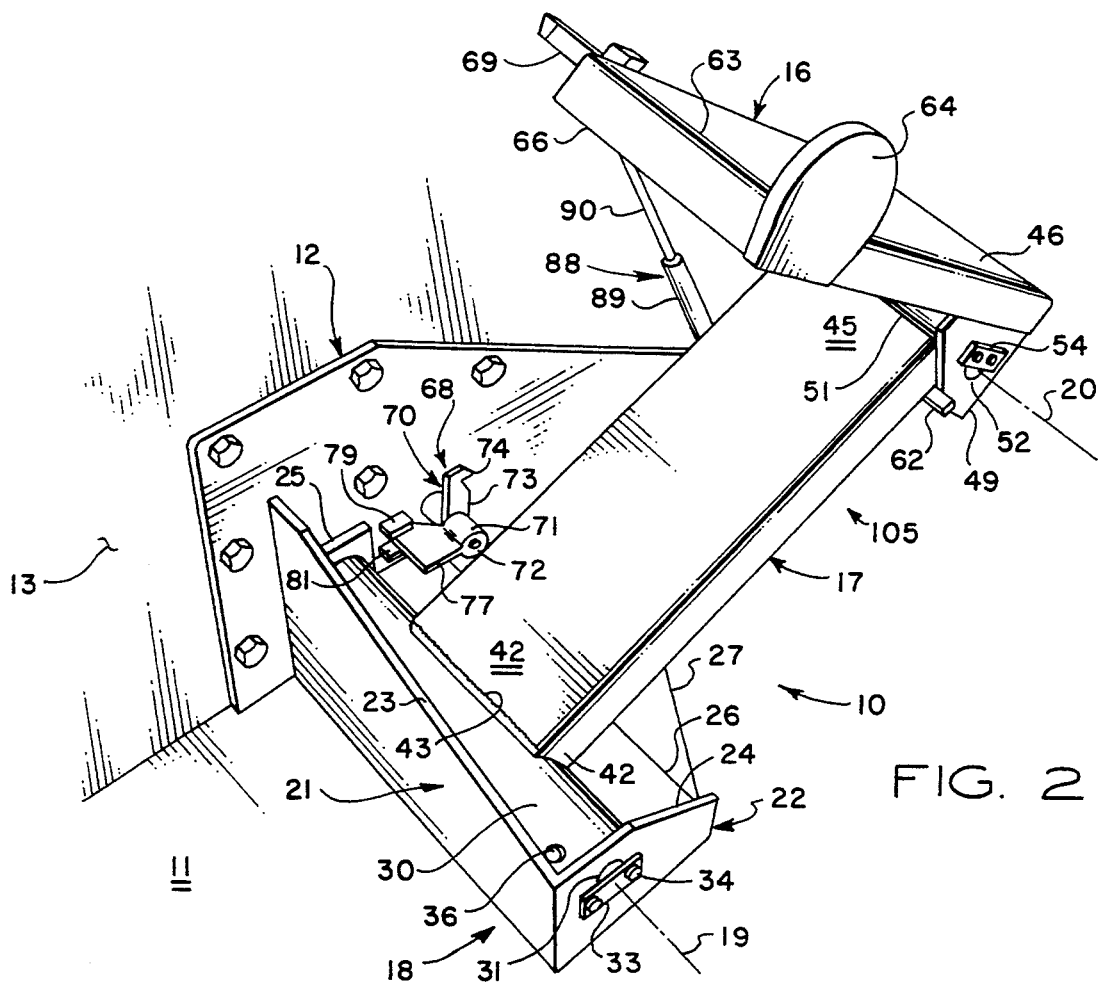
FIG. 2 is a perspective view, similar to FIG. 1, of the vehicle restraining apparatus of the invention in its fully deployed position.
Figure 1:
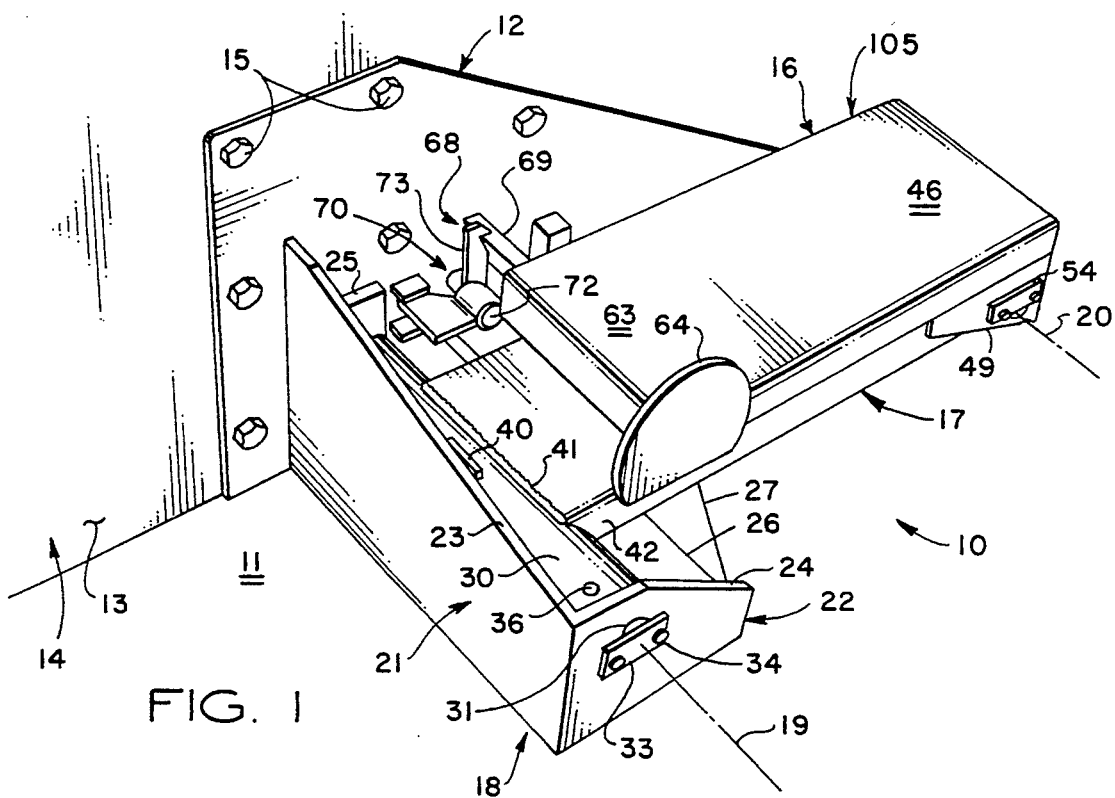
Figure 2:
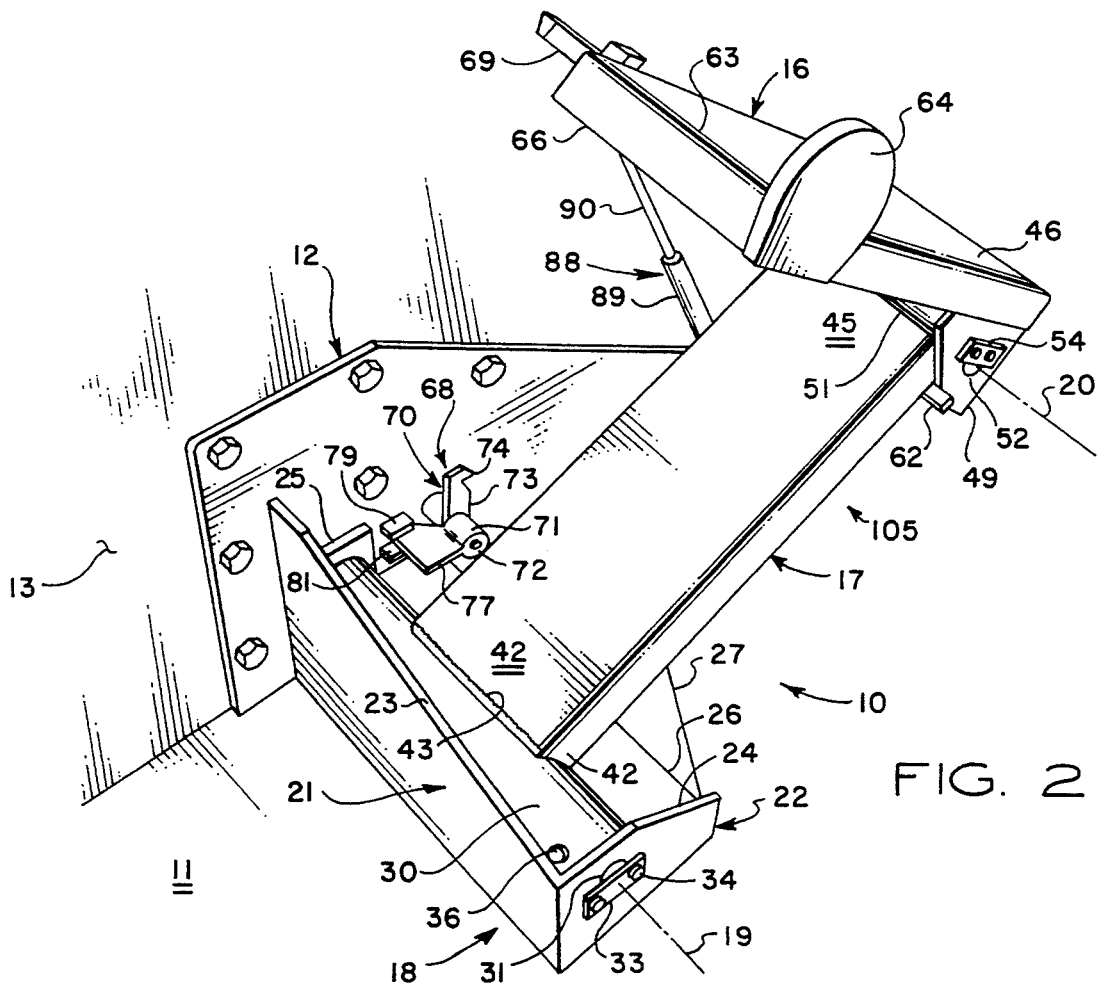
Figure 3:
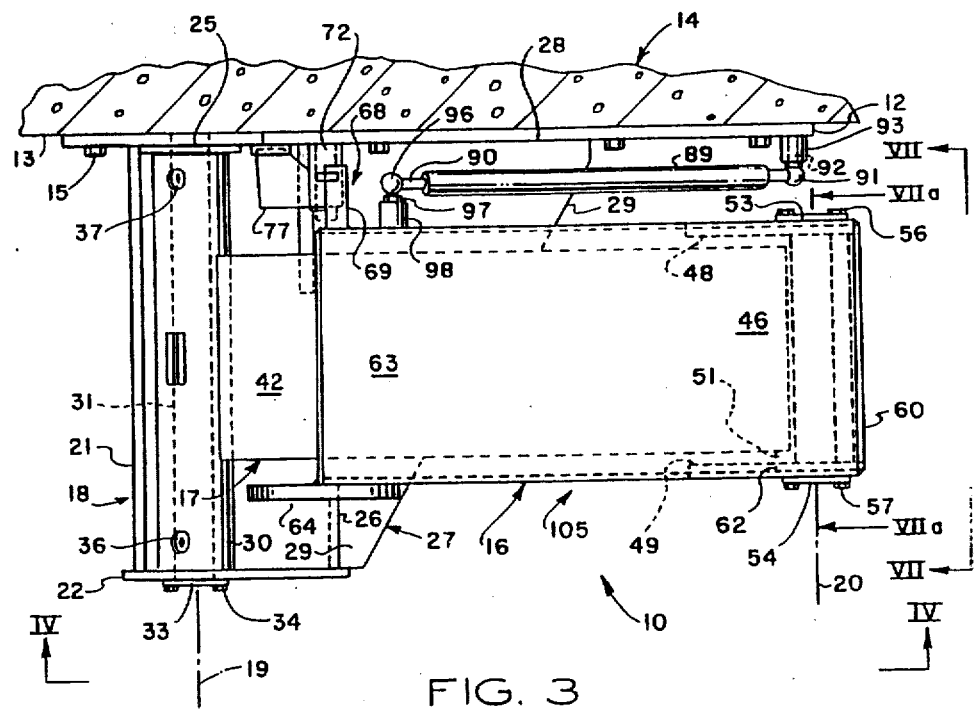
FIG. 3 is a plan view of the vehicle restraining apparatus of the invention showing the articulated structure in its retracted position.

As will be described in detail hereinbelow, the vehicle restraining apparatus 10 includes upper and lower pivot arms 16, 17, the lower pivot arm 17 extending parallel to plate 12 and being pivotally supported by the supporting structure 18 for pivotal movement about a first axis 19 extending substantially perpendicular to the upright surface 13. The upper pivot arm 16 also extends parallel to plate 12 and is pivotally associated with respect to, and extends in an opposite direction from, the lower pivot arm 17 for independent pivotal movement relative to the lower pivot arm about a second axis 20 (FIGS. 2 and 3). As shown, the axis 20 is parallel to and laterally spaced from the first axis 19 for the reasons to be more fully understood from the description to follow.

Figure 4:
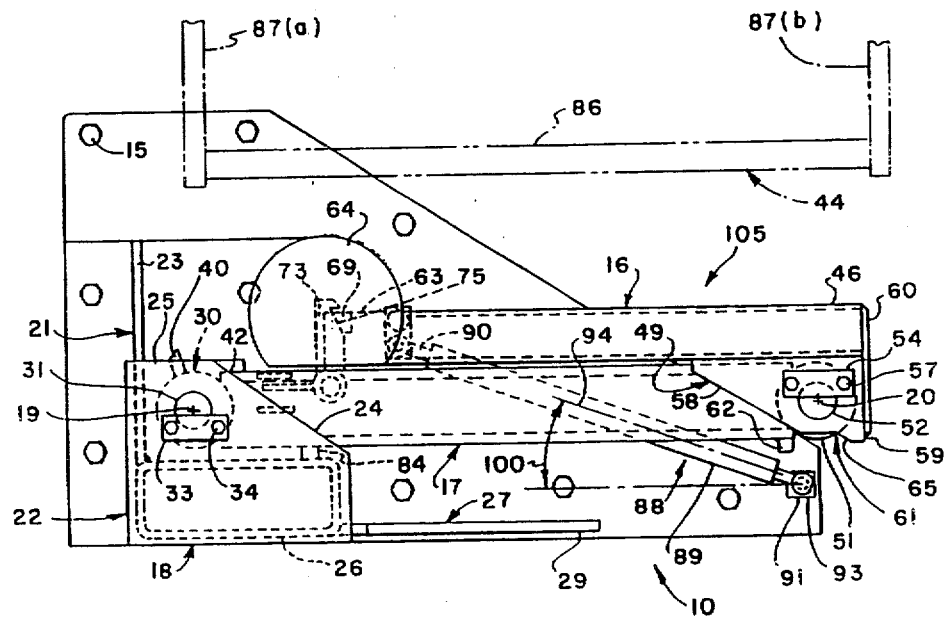
FIG. 4 is a side elevational view of the vehicle restraining apparatus of FIGS. 1-3, taken as on lines IV—IV of FIG. 3, showing a vehicle ICC bar in phantom.

In the preferred embodiment, the supporting structure 18 extends transverse to the dock 14 and engages the roadway 11. Because of the substantial loads and force which may be sustained by the supporting structure 18 and the pivot arms 16, 17 at their respective axes due to the outward movement of a restrained vehicle, they are of reinforced construction, as will now be described. A vertical gusset or end plate 21 is welded or otherwise affixed to the plate 12 and extends perpendicularly outwardly therefrom. The distal end of plate 21 is affixed, as by welding, to a vertical, outer side plate 22 which rests upon the road surface 11 and extends perpendicularly from end plate 21 in a plane parallel to the plate 12. As seen in FIGS. 1 and 2, the end plate 21 preferably includes an upper edge 23 which slopes diagonally downwardly from the plate 12 toward the end plate 22 for enhancing structural integrity and having, with the side plate 22, a low profile adjacent the outer end plate 22 for preventing interference of the supporting structure 18 with the lowermost extension of the ICC bars of trucks which are to be backed over the assembly 18 toward the dock 14 for loading or unloading. An ICC bar 44 of an adjacent vehicle is shown in phantom in FIGS. 4 and 7. As seen in FIG. 4, the ICC bar 44 includes a crosspiece 86 extending horizontally between vertical members 87(a), 87(b) which depend from the vehicle. The outer side plate 22 of structure 18 suitably includes an upper edge portion 24 which extends diagonally rearwardly and downwardly, towards its end opposite the end plate 21.

Figure 5:
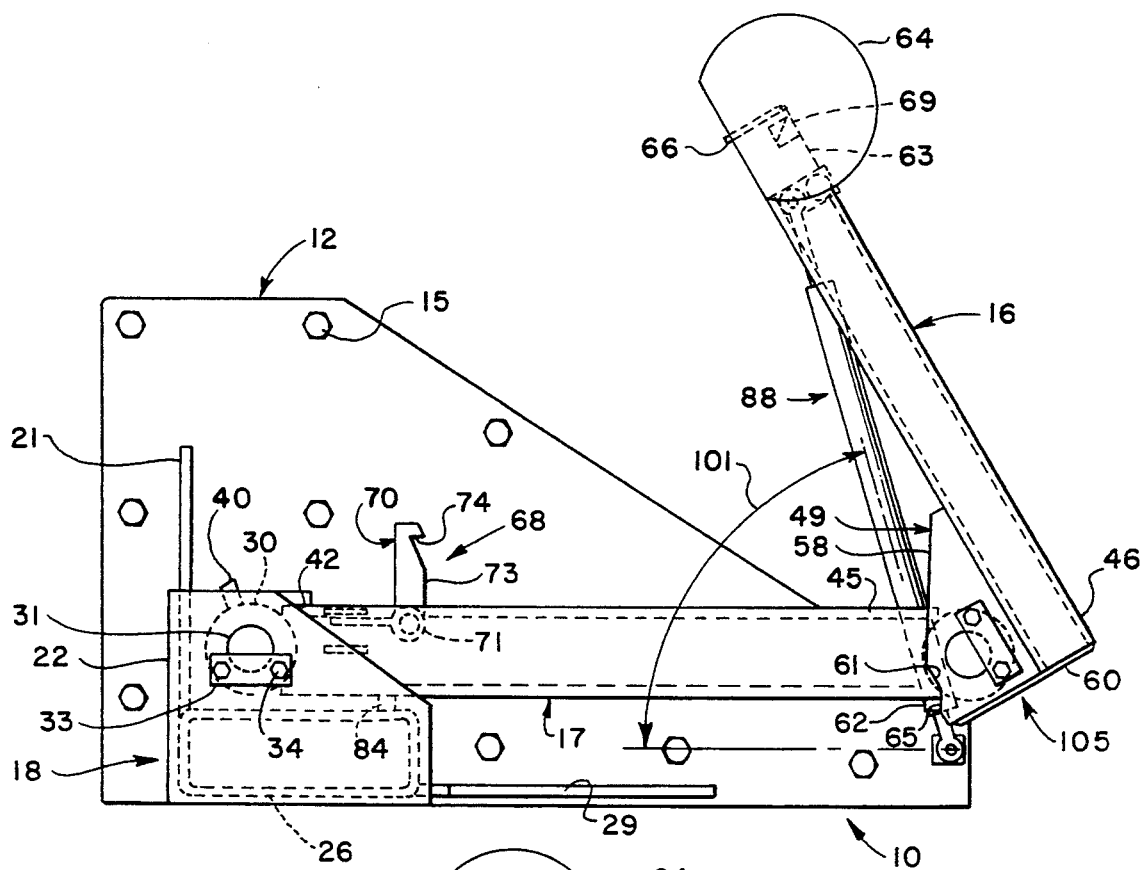
FIG. 5 is an elevational view, similar to FIG. 4, showing the articulated structure in its partially deployed position.
Figure 6:
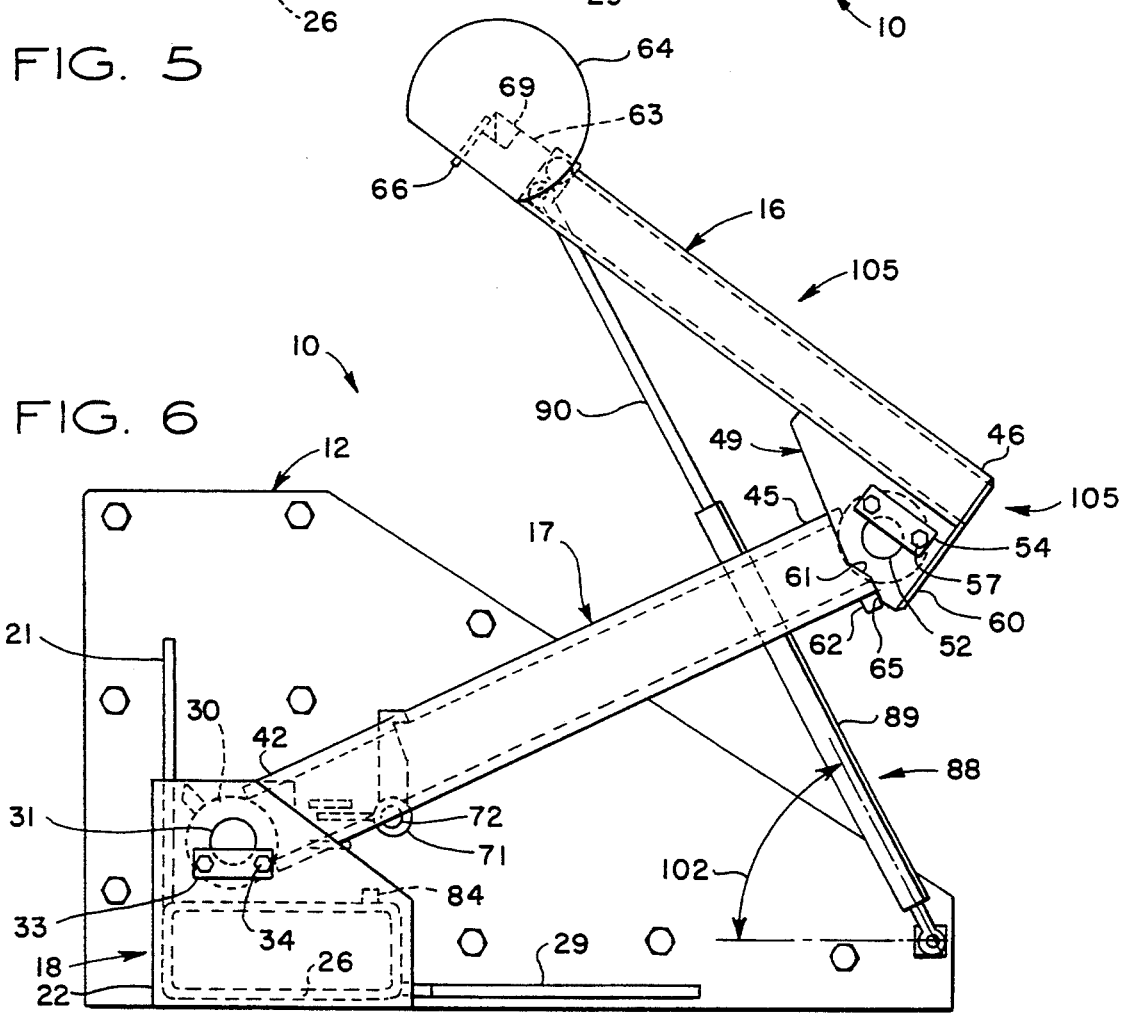
FIG. 6 is an elevational view, similar to FIGS. 4 and 5, showing the articulated structure in its fully deployed position.

For convenience and clarity of description, directional terms such as "forwardly" and "rearwardly" are used herein with respect to components having extension parallel to the vertical wall surface 13 and the roadway, the term "rearwardly" denoting the first, or rightward direction, when facing the dock upright surface 13 as in FIGS. 4–6. Similarly, "clockwise" and "counterclockwise" refer to rotational movement of components as viewed in FIGS. 4–6, unless otherwise indicated. An inner side plate 25 is affixed to and alongside the plate 12 by welding or other suitable means, in lateral alignment with the outer side plate 22. An elongated cross member 26 extends outwardly from the plate 12, to the outer side plate 22, and it is suitably welded at its inner and outer ends to the inner and outer side plate 25, 22, respectively. The cross member 26, as seen more clearly in FIG. 4, is preferably formed of plate material defining, in cross section, a rectangular configuration, with its forward sidewall extending parallel to and below the end plate 21 and being welded thereto. A generally triangular base plate 27 extends horizontally over the road surface behind the cross member 26 and between the plate 12 and the outer end side plate 22, the triangular base plate 27 having an inner edge 28 (FIG. 3) abutting and welded to the plate 12 and a forward edge 29 abutting and welded to the cross member 26.

Referring primarily to FIGS. 1, 2 and 3, a tubular member 30 is mounted between side plates 22, 25 for axial rotation within the assembly 18 about first axis 19. An axle 31 extends coaxially within the tubular member 30, and projects outwardly beyond the respective ends of the tubular member, and may be rotatably journaled within corresponding bores formed within the inner and outer side plates 25, 22, permitting axial rotation of the tubular member 30. As seen in FIG. 2, the lower pivot arm 17 is welded as shown at 43 to a central portion of the tubular member 30 intermediate side plates 22 and 25 and extends radially outwardly from the tubular member for rotation therewith. The first pivot axis 19 is thus defined by the rotational axis of tubular member 30 around axle 31. A cover plate 33 is removably mounted on the outer surface of outer side plate 22 by removable fasteners such as bolts 34 for maintaining the axle 31 journaled within the side plates 25, 22, whereby the cover plate 33 and axle 31 may be removed for servicing the mechanism. Grease fittings 36, 37 (FIG. 3) are suitably formed through the tubular member 30, adjacent its respective end portions, for facilitating lubrication of the axle 31. A stop member 40 extends longitudinally along a central portion of the tubular member 30, the stop member suitably being welded to the outer surface of the tubular member and projecting radially outwardly therefrom for engaging the end plate 21, as shown in FIG. 6, upon the tubular member and lower pivot arm 17 being rotated in a counterclockwise direction to the fully deployed position shown in FIG. 6, as will be discussed more fully in the description below. The tubular member 30, axle 31, and side plates 22, 25 thus provide a first connecting means for pivotally associating the lower pivot arm 17 to supporting structure 18.

Figure 7:
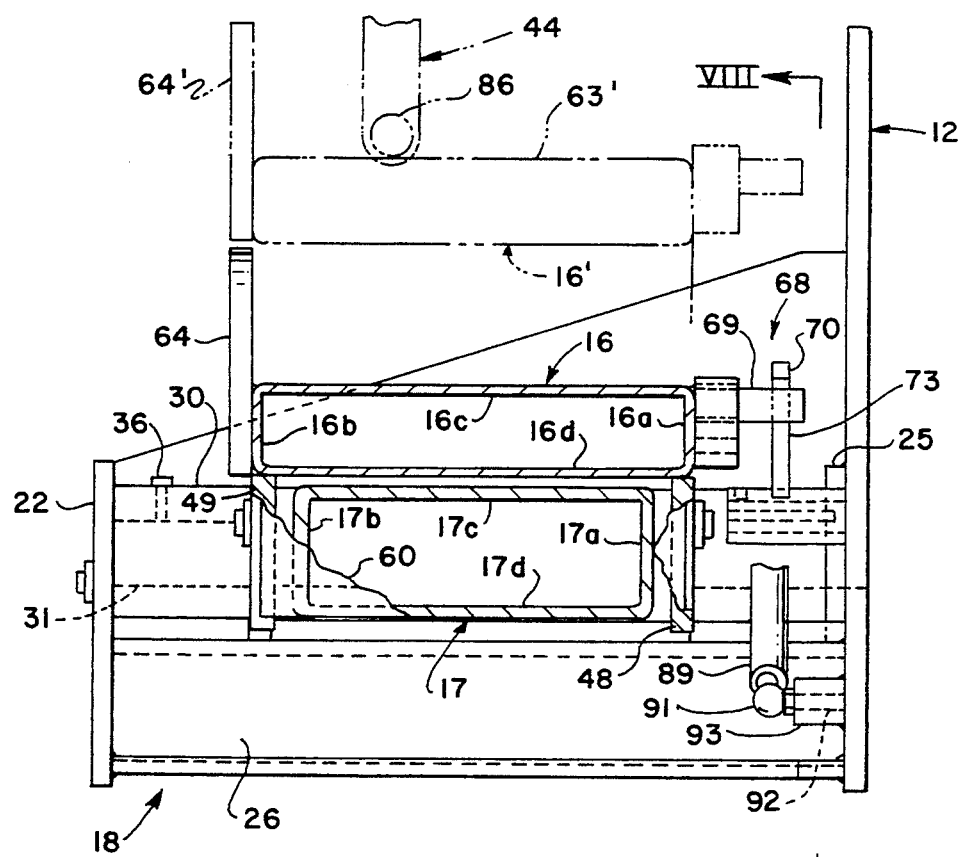
FIG. 7 is an end view on an enlarged scale of the vehicle restraining apparatus of FIGS. 1-6 taken as on line VII—VII of FIG. 3, with portions of the structure broken away for clarity and showing portions of a vehicle ICC bar in phantom.

The pivot arms 16, 17, which in their preferred embodiment comprise elongated members of generally rectangular cross section, extend in opposite directions and parallel to plate 12 (and dock face 13). When in their collapsed or retracted position, the pivot arms are vertically aligned with respect to one another, with the upper arm 16 being essentially superimposed over lower arm 17. As seen more clearly in FIG. 7, the upper arm 16, in cross section, includes inner and outer sidewall portions 16a, 16b, and upper and lower wall portions 16c, 16d. Similarly, the lower pivot arm 17, in cross section, includes inner and outer side wall portions 17a, 17b and upper and lower wall portions 17c, 17d. The pivot arms 16, 17 and frame assembly 18 are suitably formed of steel plate material having a thickness of 0.35 inch or greater. Referring to FIG. 7, in one embodiment the upper pivot arm 16 can be formed somewhat wider than the lower pivot arm 17 for permitting its interaction with lower arm 17 and for facilitating the alignment of vehicle ICC bar 44 over the upper arm 16 during operation, as will also be more fully described below. Alternatively, the lower pivot arm 17 can be formed somewhat wider than upper pivot arm 16.

As seen, for example in FIG. 2, the lower pivot arm 17 has its first or proximal end portion 42 connected to the tubular member 30. On the other hand, the lower pivot arm distal end portion 45 is pivotally associated with a first or proximal end portion 46 of the upper pivot arm 16 in the manner now described.

Figure 7A:
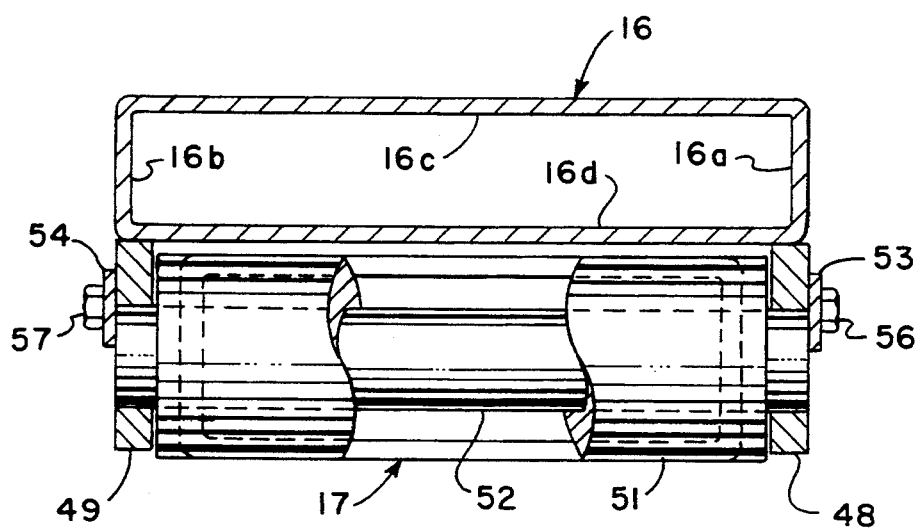
FIG. 7a is a fragmentary, partially cross-sectional view, partially cut away, taken as on line VIIa—VIIa of FIG. 3 showing the upper and lower pivot arms in section and showing the rotatable tubular member and axle which rotatably support the upper pivot arm for pivotal movement relative to the lower pivot arm.

Specifically, inner and outer hinge plates 48, 49 (referring to FIGS. 3, 7 and 7a) are welded to and depend from the lower wall portion 16d of the upper pivot arm 16 adjacent its proximal end portion 46, in alignment with the inner and outer sidewall portions 16a, 16b, respectively. The distal end portion 45 of the lower pivot arm 17 extends alongside and between the hinge plates 48, 49, as seen in FIG. 7. As seen more clearly in FIGS. 2–4 and FIG. 7a, a second tubular member 51 is affixed by welding, for example, at the distal end portion 45 of the lower pivot arm 17 (FIG. 4), the member 51 being similar to first tubular member 30, and having an axle 52 (FIG. 7a) extending coaxially therein. The axle 52 has respective end portions projecting outwardly from the tubular member 51 and may be journaled within corresponding bores formed in the inner and outer hinge plates 48, 49 (FIGS. 3 and 7a). A second pivot axis 20 is thus defined by the rotational axis extending through the second tubular member 51 and axle 52, about which upper arm 16 pivots.

As seen most clearly in FIGS. 3 and 7a, inner and outer cover plates 53, 54 are removably affixed to the inner and outer side surfaces of the hinge plates 48, 49 extending from upper pivot arm 16 by means of suitable fasteners such as bolts 56, 57. In their retracted positions as seen in FIG. 4, the upper and lower pivot arms 16, 17 extend generally parallel with the roadway surface 11, the lower pivot arm 17 extending rearwardly from first tubular member 30 in a first, substantially horizontal direction parallel to the plate 12, and the upper pivot arm 16 extending forwardly over and parallel to the lower pivot arm 17. It should also be recognized that a similar arrangement can be achieved by forming the lower pivot arm 17 wider than the upper arm 16, and welding the hinge plates to the lower arm.

A keeper member 64 is welded or otherwise affixed to the second, distal end portion 63 of upper pivot arm 16 flush with sidewall portion 16b (FIG. 7). The keeper member 64 may be of any suitable configuration, for example the curved configuration shown, extending from the upper pivot arm distal end portion 63 in the manner shown in FIG. 4. A cover 66 may be affixed to the upper arm 16 at its distal end portion 63 and extends perpendicularly across the arm 16.

With continued reference to FIG. 4, the outer hinge plate 49, as typical, is of generally triangular configuration, having a leading edge 58 extending diagonally rearwardly and downwardly below the proximal end portion 46 of the upper pivot arm 16 and having a rear edge portion 59, perpendicular to the upper arm 16, upon which is welded a generally rectangular end plate 60. End plate 60 also extends over and is welded to the proximal end portion 46 of the upper arm 16, as seen in FIGS. 3–5. The diagonally extending, leading edge 58 of hinge plate 49, as typical, includes a cutout portion 61, seen most clearly in FIG. 4. With additional reference to FIG. 5, a stop member 62, suitably comprising an elongated bar, is suitably welded to the underside of the lower pivot arm 17 adjacent its distal end portion 45 and in alignment with the cutout portion 61 whereby, upon the upper pivot arm 16 being upwardly deployed by being rotated in a clockwise direction as viewed in FIGS. 5 and 6, a radially extending surface 65 defined by the cutout portion 61 engages the stop member 62, thus defining the limit of clockwise rotation of the upper pivot arm 16 relative to the lower pivot arm 17. As seen in FIGS. 5 and 6, the upper pivot arm 16 is thereby locked against further clockwise pivotal movement relative to lower pivot arm 17.

Figure 8:
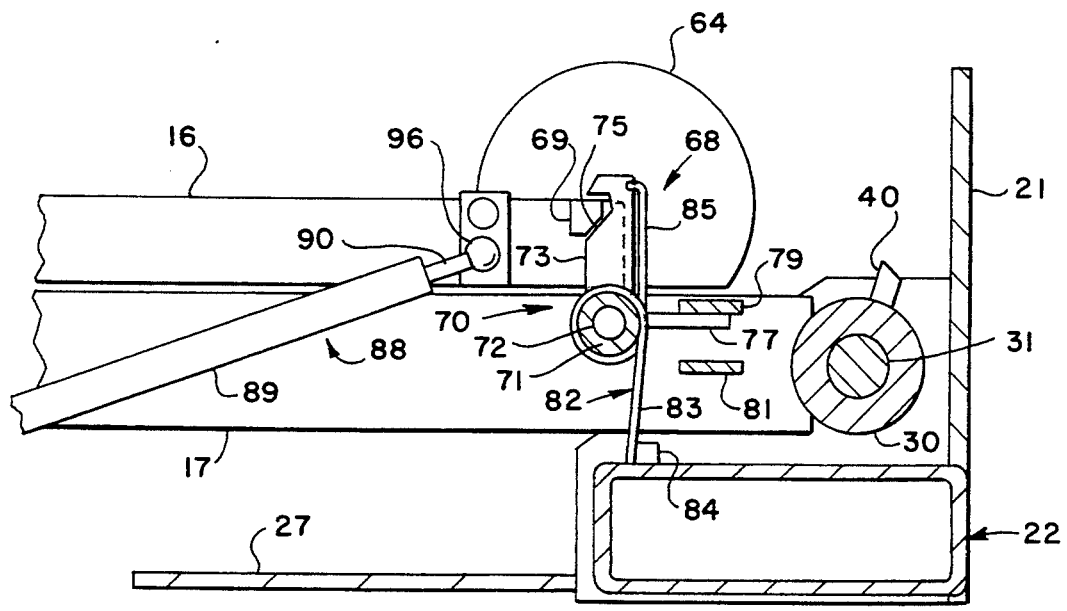
FIG. 8 is a side elevational and partially sectional view, taken as on line VIII—VIII of FIG. 7, showing portions of the articulated structure, latching mechanism, and actuating mechanism.

Referring to FIG. 1, in the first embodiment, of FIGS. 1–8, a latch assembly 68 is mounted to plate 12 in lateral alignment with the distal end portion 63 of the upper pivot arm 16, upon pivot arms 16, 17 being in their retracted positions, for releasably engaging a stop member 69 affixed to upper pivot arm 16 for maintaining the pivot arms 16, 17 in their retracted position. With additional reference to FIG. 8, the latch assembly 68 includes a rotatable latch structure 70 including a laterally extending tubular sleeve 71 rotatable about a shaft 72, the shaft 72 being rigidly secured at its inner end to plate 12 (FIG. 3) and extending perpendicularly outwardly therefrom, whereby the tubular sleeve 71 is rotatable about the shaft 72 on a pivot axis perpendicular to the mounting plate 12. A pivotable latching arm 73 is affixed to or integrally formed with the sleeve 71 and extends radially therefrom. With continued reference to FIG. 8, the distal end of the latching arm 73 defines a hook-like, latch extension 74 which is adapted to engage stop member 69. As seen in FIGS. 1 and 3, stop member 69 is suitably a rectangular bar which is welded or otherwise affixed to the lower wall portion 16a (FIG. 7) of the upper pivot arm 16 at its distal end portion 63, the stop member 69 extending laterally toward the plate 12. As seen in FIG. 4, the latching arm 73 extends generally upwardly and includes a rearwardly and downwardly centered upper surface 75 in alignment with stop member 69, whereby the latching arm is deflected forwardly upon the upper pivot arm 16 being pivoted downwardly against the latching arm. The rotatable latch assembly 70 also includes a wing portion 77 affixed to or integrally formed with the tubular sleeve 71 and extending therefrom generally horizontally and forwardly. The wing portion 77 extends between upper and lower stays 79, 81 which are welded to the mounting plate 12 for limiting clockwise and counterclockwise rotation of the latch structure 70. A spring 82, as seen most clearly in FIG. 8, is provided for actuating the latch structure 70 and includes a circular portion extending around and rotatably seated on the tubular sleeve 71, a lower leaf portion 83 engaging a stop member 84 affixed to the cross member 26 (FIG. 4), and an upper leaf portion 85 engaging the arm 73, the spring being biased to resiliently urge the latching arm 73 toward and into engagement with the stop member 69.

With continued reference to FIG. 8, a gas strut assembly 88 is provided for upwardly and pivotally deploying the pivot arms 16, 17. The strut assembly 88 is suitably of the type manufactured by Service Plus Distributors as Model P/N SPD-3100-150, rated at 150 pounds of axial force. The gas strut assembly 88 includes a cylinder 89, and a piston member 90 telescopically slidable within the cylinder. With added reference to FIG. 3, the lower end of the cylinder 89 is affixed to a first ball joint assembly 91 which is rotationally connected to a bolt or shaft 92, projecting outwardly from the plate 12 and supported by a block 93 which extends perpendicularly outwardly from the plate 12. The cylinder 89 is free to rotate in any direction upon ball joint 91. As may be seen in FIG. 4, the mounting block 93 and ball joint 91 are located adjacent and below the distal end portion 45 of the lower pivot arm 17 when the arm 17 is in its retracted position. The piston member 90 is similarly pivotally and rotationally connected to the upper arm 16 by a second ball joint assembly 96 (FIG. 3) mounted on the outer end portion of the piston member 90 and connected to the distal end of a bolt or shaft 97 secured to the upper pivot arm 16 adjacent its distal end portion 63, the shaft 97 suitably extending within a rectangular mounting block 98 (FIG. 3) affixed to the inner side of the upper pivot arm 16. When the upper and lower pivot arms 16, 17 are in their retracted positions, as seen in FIG. 4, the strut assembly 88 extends diagonally forwardly and upwardly along an axis 94 which defines an angle indicated at 100 in FIG. 4, preferably of approximately 20 degrees, for reasons which will become apparent from the description below. As will be understood by those skilled in the art, a strut assembly 88 of greater capacity and piston-face area will be selected if pivot arms 16, 17 of heavier construction are employed.

The operation of the vehicle restraining apparatus 10 of FIGS. 1–8 will now be described. In operation, the pivot arms 16, 17 of the vehicle restraining apparatus 10 are initially maintained in their retracted position, as seen in FIGS. 1, 3, 4, 7 and 8, by the spring biased latch assembly 68, wherein the latch assembly arm 73 is maintained in locking engagement with stop member 69. First, a truck or trailer is backed toward the dock for loading or unloading its cargo, the vehicle being guided over the vehicle restraining apparatus 10 such that the horizontal crosspiece 86 of the vehicle ICC bar 44 passes over the keeper member 64 and into vertical alignment with the upper pivot arm 16 as shown in FIG. 7.

Secondly, when it is desired to engage the vehicle for constraining it from movement away from the dock 14, the latch assembly 68 is disengaged, initiating deployment of pivot arm 16. Disengagement of the latch assembly 68 is suitably accomplished by means of a push rod, not shown, which may be lowered into contact with the latch wing 77 for depressing the wing, whereby the latch structure 70 is caused to rotate in a counterclockwise direction until the latch extension 74 is disengaged from stop member 69. Upon being thus released from the latch assembly 68, the upper pivot arm 16 is free to rotate, relative to lower pivot arm 17, in a clockwise direction about second axis 20. Strut assembly 88 exerts an axial force, through ball joint assembly 96, against the distal end portion 63 of the upper pivot arm 16. Thirdly, because the strut assembly cylinder 89 is connected to plate 12 by the first ball joint 91 at a location below the second ball joint 96, the force exerted by the strut assembly 88 against the upper pivot arm 16 includes an upward component, the upward force being sufficient to raise the upper pivot arm 16, rotating the upper pivot arm 16 in a clockwise direction around axle 52 and about the second pivot axis 20 until it is brought into engagement with an ICC bar of an adjacent vehicle. If such engagement is not achieved prior to reaching the intermediate position, as shown in FIG. 5, the cutout portion 61 of hinge plate 49 engages the stop member 62 mounted on lower pivot arm 17, preventing further upward pivotal movement of upper pivot arm 16 relative to lower pivot arm 17. In almost all instances normally encountered, the upper arm 16 engages the ICC bar prior to reaching its intermediate position.

In the intermediate position, the strut assembly 88 extends diagonally upwardly at an angle, indicated at 101, of approximately 80 degrees relative to a horizontal plane. As will be understood by those in the art, in this more nearly vertical position the axial forces exerted by strut assembly 88 are applied in a more nearly perpendicular, tangential direction relative to lower arm 17 and include a substantial upward tangential force component. Fourth, because the upper pivot arm 16 is locked by stop member 62 against further pivotal movement relative to lower pivot arm 17, the strut assembly 88 acts to induce upward, counterclockwise rotation of both the upper and lower pivot arms 16, 17 upon axle 31 and about first pivot axis 19. Such upward pivotal movement of pivot arms 16, 17 continues until the upper pivot arm distal end portion 63 contacts the lower surface of the ICC bar crosspiece 86 of the adjacent vehicle, whereupon the keeper member 64 is positioned adjacent and in lateral alignment with the ICC bar crosspiece 86, for preventing movement of the vehicle away from the dock 14. In this position, strut assembly 88 defines an angle 102, with a horizontal plane, slightly less than angle 101.

In a manner similar to that conventional in the art, the strut assembly 88, after the upper arm engages the ICC bar 44, resiliently maintains the upper arm distal end portion 63 in contact with the ICC bar, and the strut assembly 88 is resiliently compressible to accommodate downward movement of the pivot arms 16, 17 as the truck "floats" downwardly when cargo is being loaded. Also, as conventional, the strut assembly 88 is operable resiliently to maintain the upper pivot arm 16 in contact with the ICC bar 44 during upward movement of the ICC bar as it follows the ICC bar during unloading operations.

Fifth, when it is desired to disengage the vehicle restraining apparatus 10 for permitting movement of the vehicle away from the dock 14, the vehicle restraining apparatus 10 is disengaged from the vehicle by applying a substantially downwardly directed force on the upper pivot arm 16 sufficient to overcome the upward force component exerted by the strut assembly 88, whereby the pivot arms 16, 17 are urged downwardly, and pivoted upon axes 20, 19 to the retracted position.

Such downward force is conveniently applied by an operator standing on a dock above the apparatus by means of a push rod, not shown, which may be engaged with the mounting block 98 on the upper pivot arm 16. During such movement, the upper arm 16 is initially rotated in a counterclockwise direction relative to lower pivot arm 17, and the upper and lower arms 16, 17 are both subsequently rotated downwardly in a clockwise direction, pivotal movement of the lower pivot arm being limited by stop member 84 (FIGS. 4–6). The upper pivot arm stop member 69 is brought into contact with latching arm 73 and is engaged by the latch assembly 68.

It can now be seen that the upper and lower pivot arms 16, 17 and the bearing assembly provided by the second tubular member 51, its axle 52, and hinge plates 48, 49, and stop member 62 comprise an articulated structure 105 which is positionable, in an inoperative mode, in a retracted, folded position as seen in FIG. 1, 3, 4, 7 and 8 in which the lower pivot arm 17 extends in a substantially horizontal direction parallel to, and alongside, the upright dock surface 13, and wherein the upper arm extends over the lower pivot arm in an opposite direction and substantially parallel therewith. Strut assembly 88 thus comprises an actuating means for deploying the articulated structure 105 upwardly to a fully deployed position as seen in FIG. 6, wherein the upper and lower pivot arms 16, 17 are raised to their uppermost positions, wherein they are locked against further clockwise and counterclockwise rotation, respectively, by stop members 62 and 40. In its deployed or operative mode, the upper arm distal end portion 63 is raised into contact with the crosspiece 86 of the ICC bar 44 of an adjacent vehicle, as seen in FIG. 7. It should be understood that if the crosspiece 86 of an adjacent vehicle is relatively low, as in the case of a heavily loaded vehicle, engagement of the crosspiece by upper pivot arm 16 may occur at any position of the upper and lower pivot arms 16, 17 in which the upper pivot arm distal end portion 63 has been pivoted upwardly by a distance sufficient to raise the keeper member 64 into alignment with the ICC bar crosspiece 86. Such engagement usually occurs while the lower arm 17 remains in its retracted position, as shown in FIGS. 5 and 7, prior to the upper arm 16 being raised to its fully deployed position, provided that the upper arm has been raised sufficiently to engage the crosspiece 86, wherein the articulated structure 105 is in its vehicle engaging mode. Such upward movement necessarily exceeds a distance equal to the vertical projection of the keeper member 64 above the distal end portion 63, in that the upper pivot arm 16 and keeper member 64, in the fully retracted position, are necessarily lower than the crosspiece 86 to prevent interference therewith as the vehicle is backed over the pivot arm 16.

Figure 9A:
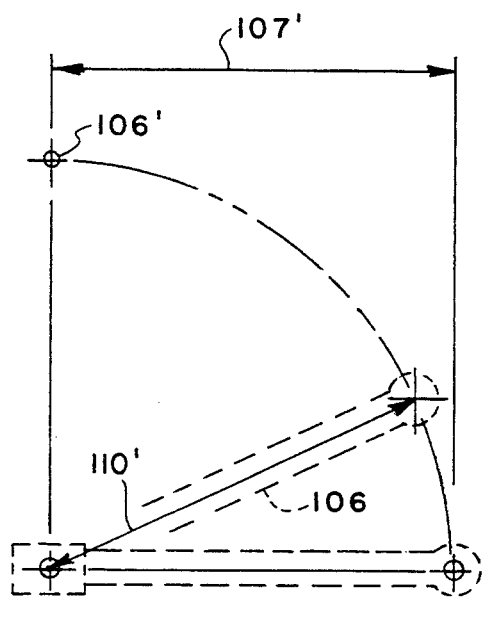
FIG. 9A is a diagrammatic representation of the movement of one type of prior art vehicle restraining apparatus employing a single keeper arm, illustrating the movement of its deployment arm and keeper.
Figure 9B:
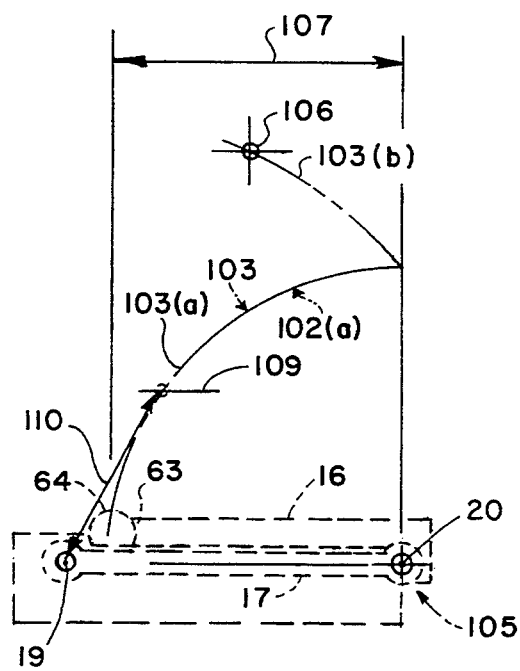
FIG. 9B is a diagrammatic representation, similar to FIG. 9A, illustrating the different path taken by the keeper member of the vehicle restraining apparatus of the present invention during movement from its retracted to its fully deployed position.

Referring to FIG. 9B, the path taken by the upper pivot arm distal end portion 63 during deployment is indicated by line 103, in which lower line section 103(a) represents the path of initial movement of the distal end portion 63 as the upper pivot arm 16 is pivoted upwardly to its intermediate position (FIG. 5), and line section 103(b) represents the path of the distal end portion 63 as the articulated structure 105 is then pivoted about the first pivot axis 19 in a counterclockwise direction to the fully deployed position, wherein distal end portion 63 is positioned as indicated at 106. As may be seen from FIG. 9B, the path taken by distal end portion 63 lies within a narrow horizontal range, its lateral displacement, indicated at 107, being substantially less than the lateral displacement of prior-art apparatus employing a single elongated pivot arm structure 106 (FIG. 9A), as indicated at 107' in FIG. 9A. Moreover, the range of lateral movement of the distal end portion 63 of the present invention is approximately centered over the vehicle restraining apparatus 10. Accordingly, alignment of a vehicle with the vehicle restraining apparatus 10 is conveniently accomplished by backing the vehicle directly over the apparatus 10, rather than to one side of the apparatus. Moreover, it is therefore not necessary to mount the apparatus 10 in a location displaced laterally from the intended parking space. Similarly, during loading or unloading of a vehicle which entails downward or upward float, the distal end portion 63 also remains within a relatively narrow lateral positional range, minimizing any lateral movement of the distal end portion 63 relative to the vehicle during such loading and unloading operations. These design features provide important advantages with respect to reliability of operation, in that the positioning of the vehicle relative to the vehicle restraining apparatus 10 is not critical, and the upper pivot arm distal end portion 63 is not substantially lateral displaced during operation and is securely maintained in contact with the ICC bar 44 during loading and unloading operations.

With reference to FIG. 9B and to FIGS. 1–6, line 109 (FIG. 9B) is indicative of the vertical position of the upper arm distal end portion 63 when engaged with the ICC bar of a heavily loaded vehicle, in which the ICC bar crosspiece is relatively low. Should the vehicle tend to move away from the dock, lateral forces are exerted against the keeper member 64 tending to urge it outwardly from the dock 14, and such forces are transmitted through the articulated structure 105 to the supporting structure 18 and particularly at the pivotal axis 19 defined by tubular member 30 and axle 31. However, the length of the "lever arm" through which such forces are transmitted, indicated at line 110 of FIG. 9B, constitutes only the displacement of the distal end portion 63 from pivot axis 19. In contrast, in conventional prior-art vehicle restraining apparatus employing a single pivot arm structure 106 (FIG. 9A), such forces are transmitted along the entire elongated pivot arm structure, and the length of the lever arm (indicated at 110' in FIG. 9A) is thus equal to the entire length of the pivot arm structure 106.

Moreover, because the lower pivot arm 17 of the vehicle restraining apparatus 10 is positioned centrally of the tubular member 30 and spaced from the supporting side plates 22, 25 (FIGS. 2 and 3), forces transmitted to the supporting structure by articulated structure 105, upon the keeper member 64 being urged laterally, outwardly from the dock, are applied through the lever arm defined between the end plates 22, 25. Accordingly, the mechanical advantage through which lateral forces are applied to the frame structure 18 is substantially lower than is the case if an elongated pivot arm structure, supported upon a conventional axle and not spaced from the supportive members 22, 25, is employed. Additionally, the preferred, rectangular cross-sectional configuration of pivot arms 16, 17 provides further important advantages. Thus, because the pivot arms 16, 17 extend laterally (parallel) relative to dock surface 13, lateral forces applied to keeper member 64 are effectively born by the relatively wide, upper and lower wall portions 16c, 16d and 17c, 17d. Because the arms 16, 17 are of substantial width and are laterally oriented, lateral forces transmitted from upper arm 16 to lower arm 17 are sustained across a "lever" which extends, across upper pivot arm 16, between hinge plates 48, 49. Additionally, the rectangular pivot arms 16, 17, in their retracted position, are of a very low profile, providing adequate clearance for adjacent vehicles, as has been discussed.

Because the pivot arms 16, 17 are rotatable about separate axes 19, 20 extending generally perpendicular to the dock 14 (FIGS. 1-4), the keeper member 64, even though travelling in a non-vertical path, is maintained in a substantially vertical orientation, in a plane substantially parallel with the dock surface 13, during all possible positions of the pivot arms 16, 17. Thus, the keeper member 64 extends alongside the ICC bar crosspiece 86, as seen in FIG. 7, the crosspiece being positioned between the keeper member and the dock 14. Such vertical orientation of the keeper member 64 ensures that locking engagement of the keeper member 64 with the ICC bar crosspiece 86 is not compromised as the pivot arms 16, 17 are raised or lowered during unloading and loading operations, or in connection with engagement of pivot arm distal end portion 63 with ICC bars of differing heights.

Accordingly, it may now be understood that the present invention provides a new and improved vehicle constraining apparatus which provides secure engagement with an adjacent vehicle. Its rotatable axles and other movable parts are shielded from the elements, and the apparatus is of relatively simple, reliable operation. Because it does not require the use of vertical or arcuate guideways or tracks, and track-following carriages, the difficulties and costs inherent in such track-following systems are avoided. Further, because the frame assembly 18 is supported upon the roadway 11, rather than being solely bolted to the dock and suspended above the roadway, loads which may be sustained by the articulated structure 105 are transmitted through structure 18 to the road surface as compressive forces. Additionally, when the articulated structure 105 is in its retracted position, the apparatus is of a low profile and is not susceptible to being damaged by vehicles which are backed over the pivot arms toward the dock, in contrast with conventional vehicle restraining systems in which vertical or arcuate tracks and other components are susceptible to damage as vehicles are backed toward the dock. Movement of the pivot arm distal end portion 63 and keeper 64, although not precisely in a vertical direction, includes only a relatively small lateral component during deployment, whereby appropriate alignment of the vehicle and the vehicle restraining apparatus as the vehicle is backed into position over the vehicle restraining apparatus is conveniently accomplished.

The apparatus as thus far described with respect to FIGS. 1-8 permits deployment of the articulated structure 105 by the gas strut assembly 88 upon the latch structure 70 being disengaged from the stop member 69, and retraction of the articulated structure is effected manually, suitably by the use of a push rod (not shown) which is brought into contact with mounting block 98 for transmitting downward force to the distal end portion 63 of the upper pivot arm 16 and for lowering the articulated structure to the retracted position, in which it is engaged with latch structure 70 as shown in FIG. 1. The embodiment of FIGS. 1-8 is thus manually operated and does not require connection to an external power source. The manually actuable embodiment entails advantages such as relative simplicity of construction and operation.

Figure 10:
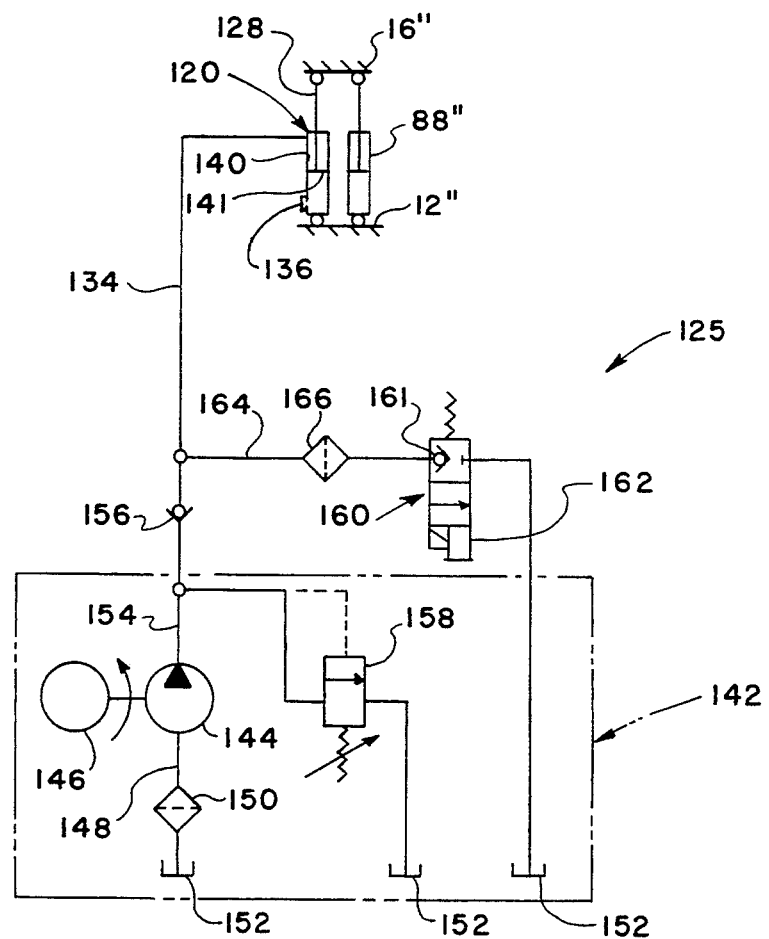
FIG. 10 is a diagrammatic representation of an electrically powered, remotely controlled hydraulic actuation system employed in a second or hydraulically actuated version of the restraining apparatus of the invention for retracting the articulated structure and for locking it in its retracted position.
Figure 11:
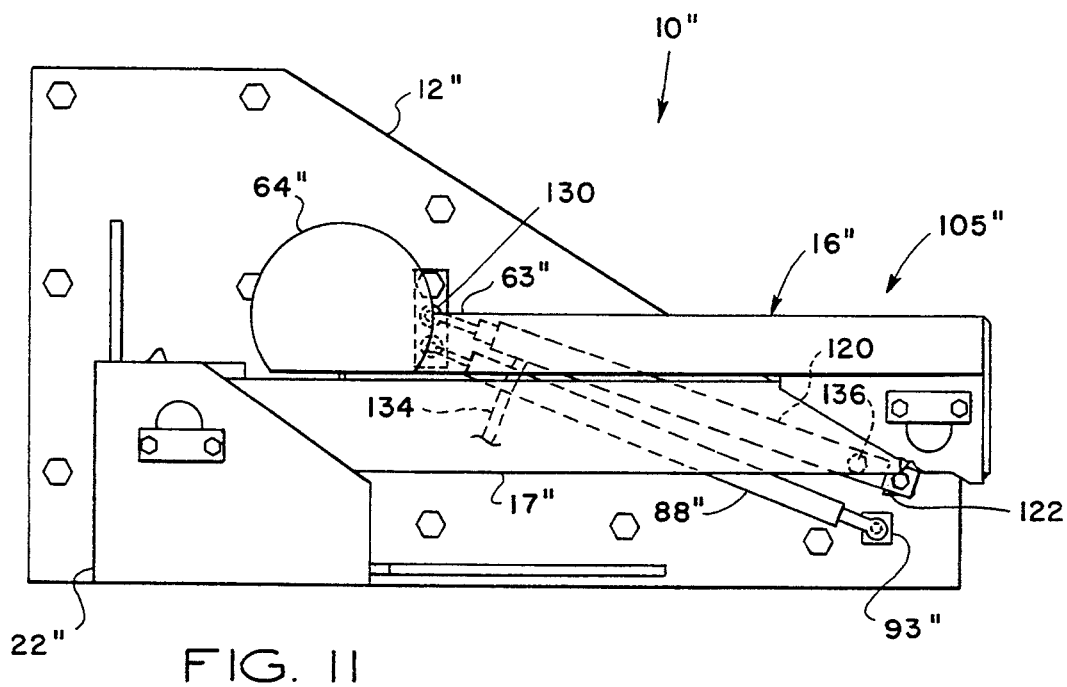
FIG. 11 is a side elevational and partially sectional view of the hydraulically actuated version of the vehicle restraining apparatus in its retracted position and showing the hydraulic actuator.
Figure 12:
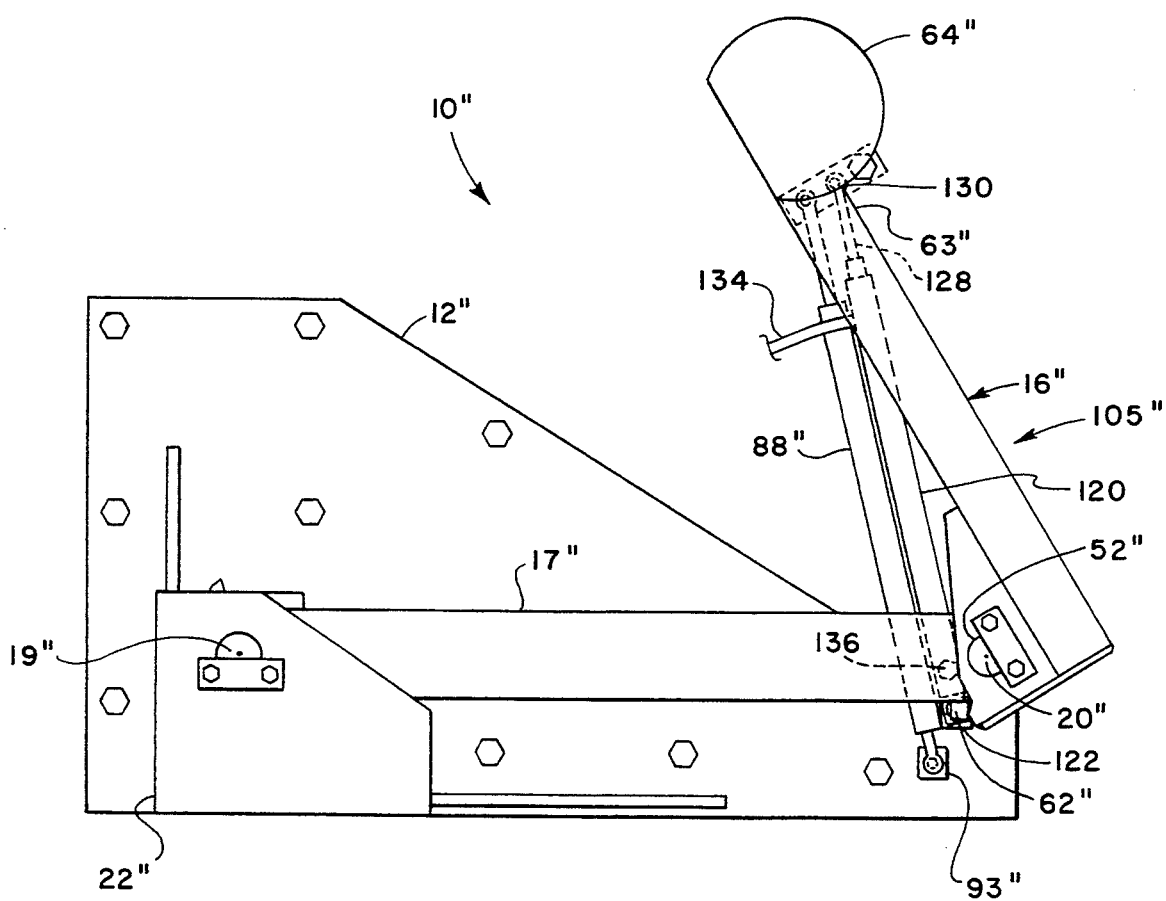
FIG. 12 is a side elevational view of the vehicle restraining apparatus shown in FIG. 11 but in its partially deployed position.
Figure 13:
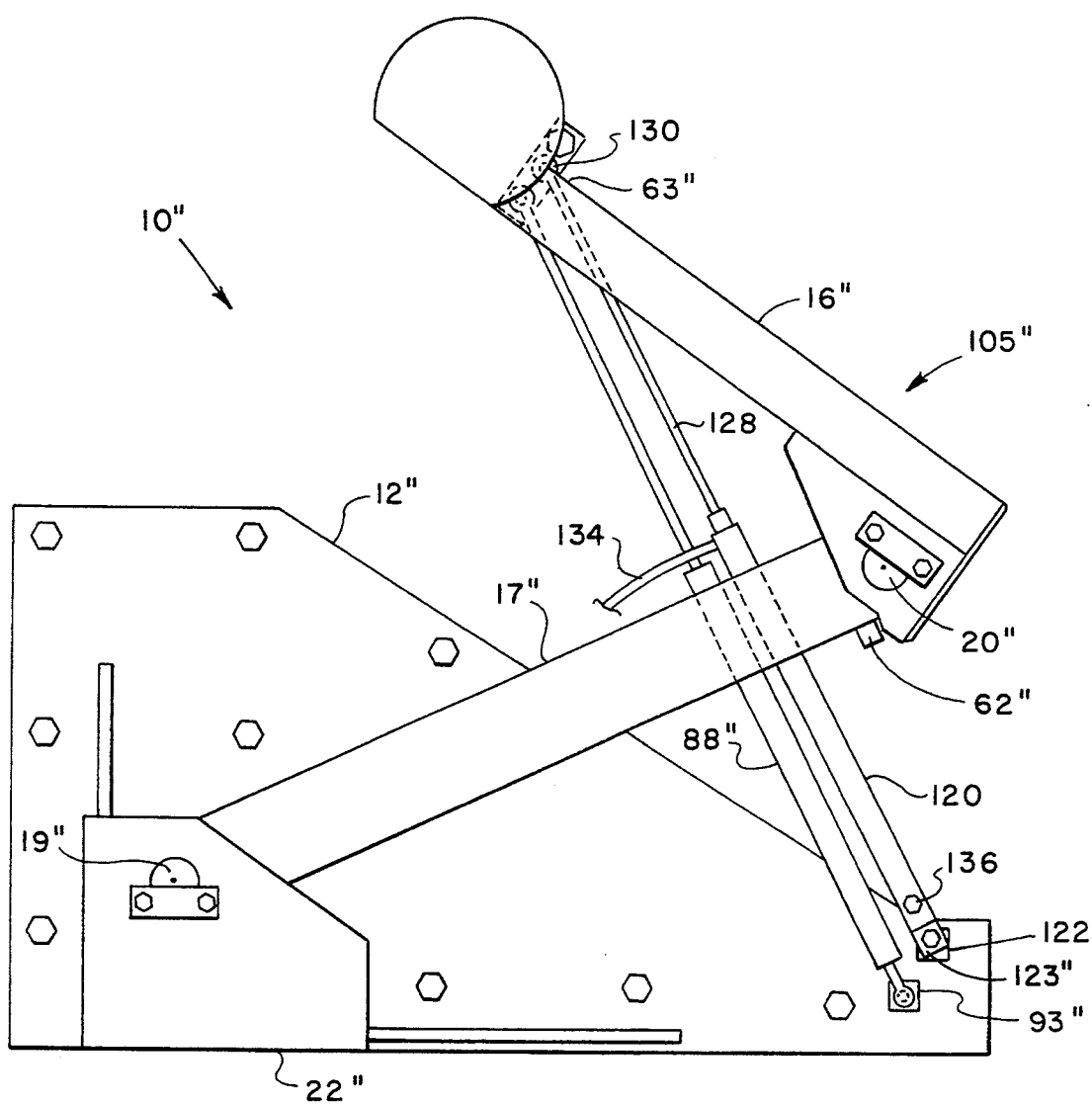
FIG. 13 is a side elevational view of the embodiment of FIGS. 11 and 12, but showing the vehicle restraining apparatus in its fully deployed position.
Figure 14:
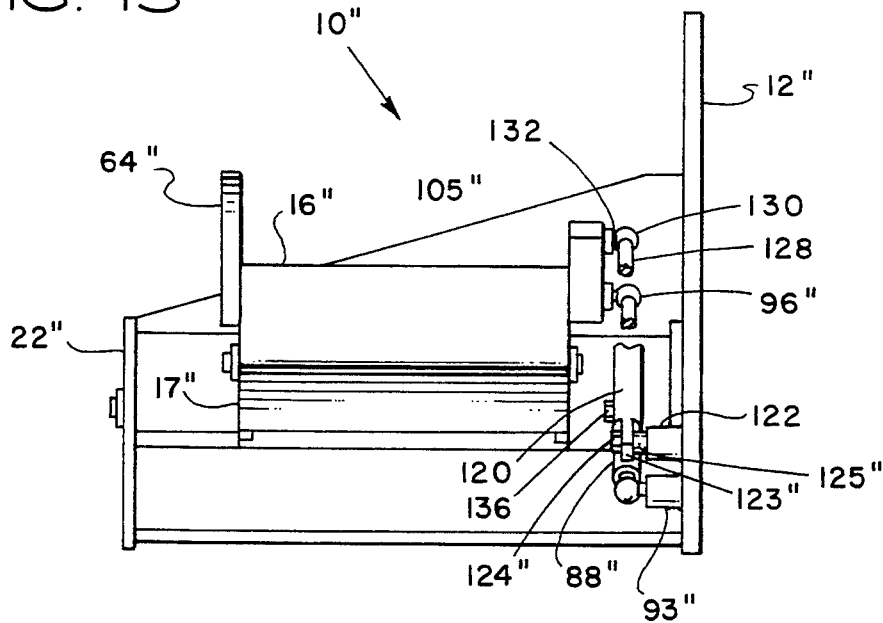
FIG. 14 is an end view of the embodiment of FIGS. 11-13 with portions of the structure broken away for clarity.

In a further embodiment shown in FIGS. 10-15, and as will be understood more fully from the description to follow, a hydraulic actuator 120 is connected between the distal end portion 63″ of the upper pivot arm 16″ and a mounting block 122 which is affixed to the plate 12″. In a preferred embodiment, the lower end of actuator 120 is provided with a flange 123″ (FIGS. 13, 14) through which a bore is formed for receiving a bolt 124″ which extends horizontally through the flange and a spacer 125″, the bolt being threaded within the mounting block 122, and extending perpendicular to plate 12″. Spacer 125″ is thus positioned between the flange 123″ and the mounting block 122, whereby the flange 123″ and actuator 120 are prevented from twisting as hydraulic pressure is applied to the actuator, but whereby the actuator 120 is free to pivot about the shank of bolt 124″. The actuator 120 includes a piston rod 128, the distal end portion of which is pivotally connected to the distal end portion 63″ of the upper pivot arm 16″ by means of a ball joint 130, the ball joint 130 being connected to the distal end of a bolt 132 (FIG. 14) extending through a mounting block in a manner similar to the connection of the gas strut assembly 88″ to upper pivot arm 16″. As shown most clearly in FIG. 12, the actuator 120 is suitably positioned such that it extends alongside and substantially parallel to the gas strut assembly 88″ and it is spaced slightly above the gas strut assembly whereby, during deployment and retraction of the articulated structure 105″, there is no physical interference between the gas strut assembly 88″ and the actuator 120. The hydraulic actuator 120, in one embodiment, defines a piston chamber having a bore of approximately 7/8-inches. One suitable, commercially available unit is that available from Clippard Instrument Laboratories of Cincinnati, Ohio as Model CS 1380. Actuator 120 is connected to a flexible, high pressure inlet hose 134. The inlet hose 134 is adapted to supply hydraulic fluid under pressure to the upper, piston rod containing, chamber portion 140 (FIG. 10) of the hydraulic actuator. A breather 136, suitably a sintered, bronze breather having pores of about 20 microns, is connected in communication with the opposite chamber portion, communicating through an opening formed in the opposite end portion of the actuator 120 (FIG. 10), for venting displaced air to the atmosphere. In operation, fluid under pressure, suitably hydraulic fluid, is conducted through inlet hose 134 to the upper piston chamber portion 140 of the actuator 120 when it is desired to retract the articulated structure 105″. Differential pressure within the actuator 120 withdraws the piston 141 and piston rod 128, exerting a downward force upon the upper pivot arm 16″ which, when added to gravitational forces upon the articulated structure 105″, is greater than the upwardly directed force exerted by the gas strut assembly 88″, whereby a net downward force is applied to retract the articulated structure 105″ to the intermediate position as shown in FIG. 12. As seen in FIG. 12, the mounting block 122 connecting the actuator 120 to the mounting plate 12″ is positioned beneath and to the left of the upper pivot arm 16″, whereby the actuator 120 exerts a generally downward force having a counterclockwise tangential component, for causing counterclockwise rotation of the upper pivot arm 16″ upon the second axle 52″, and about the second axis 20″, whereby the pivot arm 16″ is caused to rotate downwardly to its retracted position as shown in FIG. 11.

With reference to FIG. 10, the hydraulic system 125 for controlling the operation of the actuator 120 includes a high pressure, inlet hose 134 connected between the upper chamber portion 140 of actuator 120 and a source of fluid under pressure 142, which may suitably comprise an integrated hydraulic power supply unit including a hydraulic gear pump 144 driven by an electric motor 146. Such hydraulic power supply units are available commercially as integrally constructed units, and one suitable unit is hydraulic power unit Model No. 108HA 19-CS-IVT, manufactured by the Oildyne company of Minneapolis, Minn. The inlet of pump 144 is connected by means of conduit 148 through filter 150 to fluid reservoir 152, and its outlet is connected through conduit 154, which communicates, through one way check valve 156, with the high pressure inlet hose 134 for driving the hydraulic actuator 120. The resulting increase in pressure on the opposite side of piston 141 is relieved by the outlet provided through the breather 136, fluid on the opposite side of piston member 141 being displaced through the breather. A pressure relief valve 158 is connected between the pump outlet conduit 154 and reservoir 152 for controlling the pressure of fluid applied via conduit 154 to inlet hose 134, e.g., for regulating and preventing excessive pressure within conduits 154 and 134.

A solenoid actuated, spring returned, two position, two-way flow control valve 160 is connected between inlet hose 134, conduit 164, and reservoir 152. As will be more fully understood from the description to follow, the two-position flow control valve 160 serves to permit fluid flow to the upper or rod-containing chamber portion 140 of the hydraulic actuator 120 when the articulated structure 105" is to be retracted and, with the supply conduit 134, provides a means for locking the articulated structure 105" in its retracted position. Upon retraction of the articulated structure 105", the flow control valve 160 is deenergized, and its spring biased valve element shuttles to a closed position, as shown in FIG. 10, wherein the check valve 161 incorporated in flow control valve 160 serves to prevent flow of hydraulic fluid from the upper hydraulic chamber portion 140 for holding the piston 141 and piston rod 128 in their retracted positions, thereby locking the articulated structure 105" in its retracted position (FIG. 11). The two-way flow valve 160, in its deenergized position as indicated in FIG. 10, thus comprises a one-way check valve, whereby fluid within the upper chamber portion 140 of hydraulic actuator 120 may not escape from the upper chamber portion by flowing through supply hose 134 and valve 160 to reservoir 152. Similarly, check valve 156 prevents return fluid flow from chamber portion 140 to the reservoir through conduits 154 and 148. When solenoid 162 of two-way flow valve 160 is energized, the valve element is shuttled to its open position, and fluid flow through the valve 160 is permitted. The opened valve 160, and its inlet and outlet conduits, thus provide means permitting freedom of upward and downward movement of the articulated structure, whereby the articulated structure 105" is free to move upwardly and downwardly during float of the vehicle, the gas strut assembly 88" exerting sufficient upward force to overcome resistance to such movement due to frictional resistance to fluid flow within the hydraulic system as well as gravitational forces upon the articulated structure 105.

With added reference to FIGS. 15a, 15b, 15c, and 15d, the pump motor 146 of hydraulic power supply unit 142 (FIG. 10) is suitably connected through a first switch 166 to a source of alternating current 168. Similarly, a second, valve controlling switch 170 is connected between the solenoid of flow control valve 160 (FIG. 10) and the AC power source 168. As will be understood by those skilled in the art, the circuit of FIGS. 15a-15d is representative of one embodiment of such a control circuit, and additional circuit elements, controls, and modifications may be incorporated to provide further operational functions as may be required for particular applications. Switches 166 and 170 may be located remotely from the articulated structure 105" (FIGS. 11-14), switches 166, 170 being connected between power source 168 and the motor 146 and solenoid 162, respectively, by suitable electrical conductors as shown in FIGS. 15a-15d, for permitting operation of the vehicle restraining apparatus 10" (FIGS. 11-14) from a selected location.

In operation, and with initial reference to FIGS. 10 and 11, when it is desired to deploy the articulated structure 105" of the embodiment of FIGS. 10-15, the first switch 166 is "open", whereby the power unit 142 is switched off, and wherein the electric motor 146 does not actuate pump 144. As shown in FIG. 15a, the second switch 170 is closed, whereby the solenoid 162 of two-way flow valve 160 (FIG. 10) is energized, causing the valve element to shuttle to its open position for permitting fluid flow between the upper piston chamber portion 140, through hose 134, conduit 164, filter 166, and two-way flow valve 160, to reservoir 152. Because the actuator piston 141 is then free to move outwardly within the piston chamber, the gas strut 88" deploys the articulated structure 105" upwardly in the same manner previously described with respect to the embodiment of FIGS. 1-8. Since both the gas strut assembly 88" and the hydraulic actuator 120 are connected between the upper pivot arm 16" and the mounting plate 12", or other grounded structure, the rods and cylinders of the gas strut assembly and the hydraulic actuator 120 move in tandem as the upper pivot arm 16" is raised or lowered. Accordingly, as the upper pivot arm 16" is raised by gas strut assembly 88", the piston member 141 of the hydraulic actuator 120 is displaced outwardly, forcing hydraulic fluid from the upper chamber portion 140 through fluid line 134 and two-way flow valve 160 to the reservoir 152. As will be understood by those in the art, the gas strut assembly 88" must be of sufficient capacity to raise the articulated structure 105", overcoming gravitational forces and exerting sufficient upward force for translating the piston member 141 upwardly within actuator 120, and overcoming resistance to fluid flow within the hydraulic lines connected between chamber portion 140 and reservoir 152. Accordingly, the gas strut assembly 88" in the embodiment of FIGS. 10-15 is preferably of somewhat greater power than the strut assembly 88 used in the embodiment of FIGS. 1-8 (wherein the frictional resistance added by the hydraulic system 125 is absent). Suitably, a gas strut assembly 88" rated at approximately 200 pounds is employed. After deployment of the articulated structure 105" to a vehicle-engaging condition, the first switch 166 is opened and the second switch 170 remains closed, as shown in FIG. 15b. Accordingly, the two-way flow control valve 160 remains activated, in its open position, for permitting substantially unrestricted vertical movement of the articulated structure 105". Thus, the articulated structure 105" is free to move upwardly or downwardly, but it is continuously urged in an upward direction by the gas strut assembly 88", as in the embodiment of FIGS. 1-8. It therefore "follows" and remains in locking engagement with the ICC bar of an adjacent vehicle during upward or downward float of the vehicle during loading and/or unloading operations.

Figure 15A:
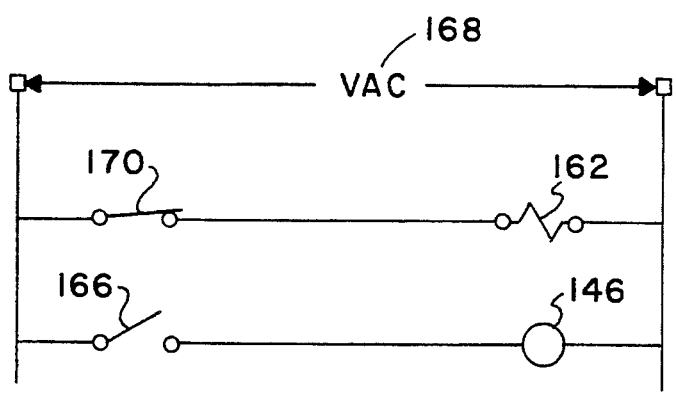
FIG. 15a, 15b, 15c, and 15d are diagrammatic representations of the electrical controls for the hydraulic actuation system showing the positions of switches employed for actuating the pump and the flow control valve during: (1) a deployment mode, (2) a deployed and floating mode, (3) a retraction mode, and (4) a retracted and locked mode, respectively.
Figure 15B:
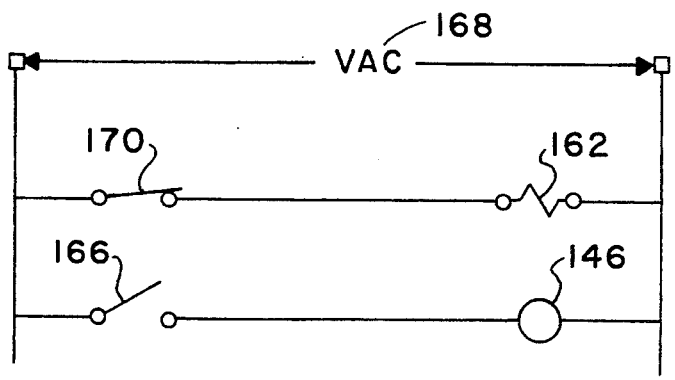
Figure 15C:
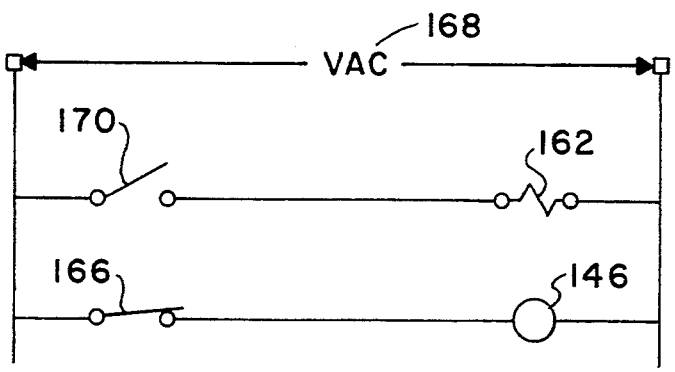
Figure 15D:
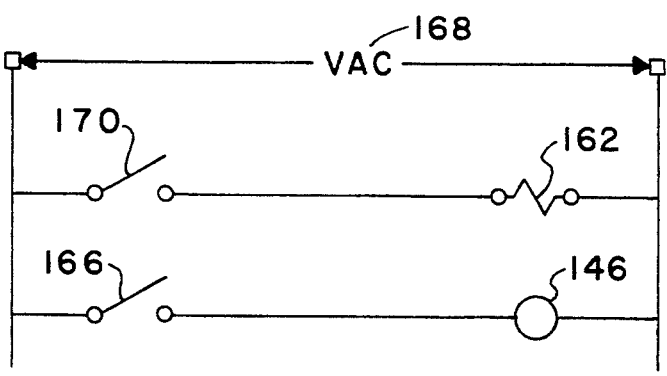

When it is then desired to retract the articulated structure 105" to permit its disengagement from the adjacent vehicle, the first switch 166 is closed and the second switch 170 is opened, as shown in FIG. 15c. The two-way flow valve 160 is thereby deenergized, whereby its spring-biased valve element is permitted to return to the closed position as shown in FIG. 10. The electrical motor 146 is turned on, whereby the pump 144 operates to pump hydraulic fluid through conduit 154, check valve 156, and supply hose 134 to the upper piston chamber portion 140 of actuator 120 (FIG. 10). Fluid pressure within the upper chamber portion 140 is applied over the upper piston face area of piston member 141 and exerts a force tending to retract the piston member 141, thereby pulling the upper pivot arm 16" downwardly, the downward force, and gravitational force, being sufficient to overcome the oppositely directioned force exerted by gas strut unit 88". The upper and lower pivot arms 16", 17" are therefore pulled downwardly. The lower pivot arm 17" is rotated in a clockwise direction about the first pivot axis 19", and the upper pivot arm 16" is rotated in a counterclockwise direction relative to lower arm 17" about second pivot axis 20" until the articulated structure 105" is fully retracted, as seen in FIG. 11. The mounting block 122 and bolt 124" through which the flange 123" of hydraulic actuator 120 is connected to the mounting plate 12", is spaced sufficiently leftwardly, as viewed in FIGS. 11-13, that if the lower pivot arm 17 is lowered to its horizontal position, prior to any counterclockwise rotation of upper arm 16" about axis 20" as shown in FIG. 12, i.e., wherein the articulated structure 105" is in its intermediate position, the downward force exerted by the actuator 120 as the piston member 141 is further retracted includes a component urging the distal end portion 63" of the upper pivot arm 16" leftwardly, in a counterclockwise rotational direction, for retracting the upper pivot arm. That is, because the linear force exerted by the actuator 120 is exerted along an axis which is diverted inwardly or leftwardly from the axis extending between the upper pivot arm distal end portion 63" and the second pivot axis 20", a generally leftward force is exerted tangentially upon the distal end portion 63, causing counterclockwise rotation of the upper pivot arm 16". As the upper pivot arm 16" is lowered by the hydraulic actuator 120 to its fully retracted position, piston member 141 (FIG. 10) is fully retracted. The first switch 166 is then opened, shutting off the pump motor 166, and the second switch 170 remains opened, as shown in FIG. 15d. The hydraulic power unit 142 is thereby deactivated and the solenoid 162 of two-way flow valve 160 remains deenergized, whereby the valve member of two-way flow valve 160 is maintained by spring action in its normally closed position, locking the hydraulic system. As discuss above, because hydraulic fluid then may not flow from the actuator upper chamber portion 140 to the reservoir 152, the piston member 141 remains locked in its retracted position, thereby locking the articulated structure 105" in its retracted position, as viewed in FIG. 11.

Accordingly, the use of the hydraulic actuator 120 in tandem with the gas strut assembly 88" permits convenient operation of the vehicle engaging apparatus 10" from a remote location and permits freedom of movement of the articulated structure 105 when the flow control valve is energized, utilizing beneficial characteristics inherent in the hydraulic and the gas strut systems. Because the gas strut assembly 88" is employed for deploying the articulated structure 105" upwardly and maintaining the upper pivot arm 16" in contact with an adjacent vehicle, and because the flow valve 160 is then maintained in an open position for permitting freedom of vertical movement of the articulated structure 105", the upper pivot arm 16" is maintained in the secure, locking engagement with the ICC bar of an adjacent vehicle despite vertical "floating" movement thereof as has become expected of vehicle restraints by the industry. Such continuous, locking engagement with the vehicle ICC bar is, of course, of critical importance for preventing accidents which could result in damage to property or injury to adjacent workers. When it is desired to retract the articulated structure 105" to release the vehicle, actuation of the hydraulic power unit 142 is conveniently effected by means of electrical switches 166, 170, from an adjacent or a remote location, permitting deployment and retraction of the articulated structure 105" from a remote location. Additionally, the normally closed two-way valve 160, which in its deenergized mode serves to lock the hydraulic cylinder 141 in its retracted position and thereby maintain the articulated structure 105" in its retracted position, eliminates the need for a mechanical locking device such as latching assembly 68 (FIGS. 1-8). However, in some embodiments, it may also be desirable to include a solenoid actuated latching assembly, not shown, for supplementing the hydraulic locking system provided by the two-way flow valve 160.

The use of both the hydraulic actuator 120 and the gas strut assembly 88" permits efficient, remotely controlled operation of the apparatus 10 without the use of complex sensors and servo-control mechanisms which would otherwise be required if a hydraulic and electrical servo-control system were employed for positioning the upper pivot arm 16" and causing it to track the ICC bar, during floating movement of the vehicle.

While alternate embodiments of the apparatus, together with modifications thereof, have been described in detail herein and shown in the accompanying drawing, it will be evident that various further modifications are possible in the arrangement and construction of its components without departing from the scope of the invention.

What is claimed is:

1. A vehicle restraining apparatus for restraining a vehicle adjacent a structure having an upright surface, comprising:

a supporting structure adapted for mounting adjacent the upright surface;

substantially vertically aligned upper and lower pivot arms each having respective first and second end portions;

first means for pivotally associating the first end portion of the lower pivot arm to and symmetrical with respect to the said structure and for permitting pivotal movement of the lower pivot arm about a first pivot axis substantially perpendicular to the upright surf,ace, and second means, pivotally associating the second end portion of the lower pivot arm to the first end portion of the upper pivot arm, for permitting pivotal movement of the upper pivot arm, relative to the lower pivot arm, about a second pivot axis spaced from said first pivot axis, the pivot arms comprising an articulated structure positionable in a first, folded, retracted position in which the lower pivot arm extends in a first, substantially horizontal direction and the upper pivot arm extends over the lower pivot arm in a substantially opposite direction, and a second, vehicle-engaging position;

actuating means for deploying the articulated structure to its vehicle-engaging position.

2. The apparatus of claim 1, wherein the actuating means comprises means for upwardly deploying at least the upper pivot arm.

3. The apparatus of claim 2, wherein the second pivot axis is parallel to and spaced from the first pivot axis and wherein the actuator means comprises means for pivoting the upper pivot arm, relative to the lower pivot arm, in a first rotational direction about the second pivot axis and for pivoting the lower pivot arm in a second, opposite pivotal direction about the first pivot axis.

4. The apparatus of claim 3, wherein the actuating means comprises a gas-filled strut assembly.

5. The apparatus of claim 4, wherein the strut assembly has a first end portion rotationally associated with the supporting structure and a second end portion rotationally associated with the second end portion of the upper pivot arm.

6. The apparatus of claim 2, wherein the articulated structure includes locking means for preventing pivotal movement of the upper arm, relative to the lower arm, beyond a locked position.

7. The apparatus of claim 1, the vehicle being of a type having a laterally extending structural member, the upper pivot arm having a vehicle restraining means for engaging the laterally extending structural member of the vehicle.

8. The apparatus of claim 7, the vehicle restraining means comprising a keeper member affixed to the second end portion of the upper pivot arm and extending above said second end portion.

9. The apparatus of claim 8, the keeper member comprising a plate member, the articulated structure comprising means for maintaining the plate member in substantially vertical alignment during deployment of the articulated structure.

10. The apparatus of claim 9, the upper pivot arm being of rectangular cross-sectional configuration and having an outer side portion, the keeper member being mounted flush with the outer side portion adjacent the upper pivot arm distal end portion, said distal end portion having an upper, vehicle engaging surface.

11. The apparatus of claim 3, wherein the actuating means comprises a gas operated actuator, operatively connected between the upper pivot arm and the supporting structure, the gas operated actuator having a linearly translatable, outwardly biased piston rod member for deploying the articulated structure to its vehicle-engaging mode.

12. The apparatus of claim 1, further comprising fluid actuated means for retracting the articulated structure.

13. The apparatus of claim 12, wherein the fluid actuated means comprises a fluid driven actuator connected between the support structure and the distal end portion of the upper pivot arm.

14. A vehicle restraining apparatus for restraining a vehicle adjacent a construction having an upright surface, comprising:

a first supporting structure disposed and supported on a vehicle supporting surface adjacent the upright surface;

upper and lower pivot arms each having respective first and second end portions;

first means for pivotally associating the first end portion of the lower pivot arm to the first structure intermediate thereof and for permitting pivotal movement of the lower pivot arm about a first pivot axis substantially perpendicular to the upright surface, and second means, pivotally associating the second end portion of the lower pivot arm to the first end portion of the upper pivot arm, for permitting pivotal movement of the upper pivot arm, relative to the lower pivot arm, about a second pivot axis spaced from said first pivot axis, the pivot arms comprising a second, articulated structure positionable in a folded, retracted position in which the lower pivot arm extends in a first, substantially horizontally direction and the upper pivot arm extends over the lower pivot arm in a substantially opposite direction, and a second, vehicle-engaging position;

gas operated actuating means, connected between the first structure and the second end portion of the upper pivot arm, for deploying the second, articulated structure in its vehicle-engaging position;

fluid operated retracting means, having an actuator connected between the first structure and the second end portion of the upper pivot arm, for retracting the second, articulated structure.

15. The apparatus of claim 14, the gas operated actuating means comprising means for exerting an upwardly directioned force on the upper pivot arm, the fluid operated retracting means comprising means for exerting a downward force on the upper pivot arm sufficient, together with gravitational forces upon the pivot arms, to overcome the upward force exerted by the gas operated actuating means and retract the articulated structure.

16. The apparatus of claim 15, the fluid operated retracting means comprising a hydraulic system for selectively applying fluid under pressure to the actuator for retracting the articulated structure, further including a fluid reservoir, and valve means connected between the actuator and the fluid reservoir, the valve means comprising means for preventing release of hydraulic fluid from the actuator, upon the articulated structure being in its retracted position, for locking the articulated structure in its retracted position.

17. The apparatus of claim 16, further comprising means for opening the valve means, upon the articulated structure being deployed and upon the hydraulic system for selectively applying fluid under pressure to the hydraulic actuator being shut off, for permitting upward and downward movement of the articulated structure.

18. A vehicle restraining apparatus for restraining a vehicle from moving away from a loading dock, comprising:

a supporting structure disposed and mounted on a vehicle supporting surface adjacent the said loading dock;

means for attaching a portion of said supporting structure to a generally vertical face of said loading dock while said supporting structure is mounted on said vehicle supporting surface;

substantially vertically aligned upper and lower pivot arms respectively constituting first and second members, each having respective inner and outer end portions;

means pivotally associating the inner end portion of the lower pivot arm first member to and symmetrical with respect to the said supporting structure and for permitting pivotal movement of the lower pivot arm first member about a first pivot axis substantially perpendicular to the said vertical face, and means pivotally associating the outer end portion of the lower pivot arm first member to the inner end portion of the upper pivot arm second member, for permitting pivotal movement of the upper pivot arm second member, relative to the lower pivot arm first member, about a second pivot axis substantially perpendicular to said vertical face and spaced from said first pivot axis, the pivot arms forming an articulated structure in which the lower pivot arm first member extends in a direction away from the said supporting structure and the upper pivot arm second member extends in a substantially opposite direction toward the said supporting structure; and means for deploying the articulated structure between a folded storage position to an unfolded vehicle-engaging position.

* * * * *

UNITED STATES PATENT AND TRADEMARK OFFICE
CERTIFICATE OF CORRECTION

Page 1 of 2

PATENT NO. : 5,348,437
DATED : September 20, 1994
INVENTOR(S) : Leroy G. Krupke, et. al.

It is certified that error appears in the above-identified patent and that said Letters Patent is hereby corrected as shown below:

Drawings:

Sheet 2 of 9

Delete Figs. 1 and 2, and substitute Figs. 3 and 4 as shown on the attached sheets.

Signed and Sealed this

Twenty-fourth Day of September, 1996

*Attest:*

BRUCE LEHMAN

*Attesting Officer*  *Commissioner of Patents and Trademarks*